United States Patent [19]

Berner et al.

[11] Patent Number: 5,260,874
[45] Date of Patent: Nov. 9, 1993

[54] AIRCRAFT FLIGHT EMULATION TEST SYSTEM

[75] Inventors: Ann E. Berner, Seattle; John R. Bucher, Renton; Lawrence E. Holliday, Seattle; Hugh C. Murray, Kent, all of Wash.

[73] Assignee: The Boeing Company, Seattle, Wash.

[21] Appl. No.: 996,833

[22] Filed: Dec. 23, 1992

Related U.S. Application Data

[63] Continuation of Ser. No. 577,853, Sep. 5, 1990, abandoned.

[51] Int. Cl.$^5$ .................. G09B 9/10; G09B 9/26; G09B 9/42
[52] U.S. Cl. .................. 364/424.03; 364/424.06; 434/35; 434/37; 434/242
[58] Field of Search .................. 364/424.03, 424.04, 364/424.06, 148, 149, 150, 151; 324/73.1; 371/27; 434/30, 35, 45, 37, 242

[56] References Cited

U.S. PATENT DOCUMENTS

| | | | |
|---|---|---|---|
| 3,546,350 | 12/1970 | Reynolds | 434/35 X |
| 3,694,930 | 10/1972 | Howland et al. | 434/242 |
| 3,861,065 | 1/1975 | Courtenay et al. | 434/45 |
| 3,903,614 | 9/1975 | Diamond et al. | 434/45 |
| 4,207,611 | 6/1980 | Gordon | 364/424.03 |
| 4,280,285 | 7/1981 | Haas | 434/30 |
| 4,358,822 | 11/1982 | Sanchez | 364/151 |
| 4,490,117 | 12/1984 | Parker | 434/35 |
| 4,626,996 | 12/1986 | Arlott | 364/424.06 |
| 4,663,703 | 5/1987 | Axelby et al. | 364/149 |
| 4,701,867 | 10/1987 | Bruwggemann | 364/550 |
| 4,760,329 | 7/1988 | Andreano | 324/73.1 |
| 4,792,951 | 12/1988 | Nielsen | 371/27 |
| 4,983,898 | 1/1991 | Kanda | 364/150 X |
| 5,023,791 | 6/1991 | Herzberg et al. | 364/424.04 |
| 5,070,458 | 12/1991 | Gilmore et al. | 364/424.06 |
| 5,077,671 | 12/1991 | Leslie et al. | 364/424.03 |
| 5,079,707 | 1/1992 | Bird et al. | 364/424.04 |

OTHER PUBLICATIONS

D. A. Mackall et al., "The NASA-Integrated Test Facility and Its Impact On Flight Research," *AIAA Fourth Flight Test Conference*, May, 1988.

*Primary Examiner*—Thomas G. Black
*Assistant Examiner*—Collin W. Park
*Attorney, Agent, or Firm*—Christensen, O'Connor, Johnson & Kindness

[57] ABSTRACT

An aircraft test system generates stimuli that emulate the stimuli received by an aircraft when in flight is disclosed. The aircraft test system includes a number of instruments for generating the number of processor-controllable instruments for generating stimuli received by an aircraft when in flight. The system also includes a number of instruments that monitor the response of the various aircraft components to the stimuli to which the aircraft is exposed. A processor in response to the output signal from the aircraft components directs the stimuli generating instruments to produce stimuli that emulate those received by the aircraft as it moves through the air. The system thus generates an initial set of stimuli similar to what an aircraft would be exposed to when in flight; monitors the response of the aircraft to the stimuli to which it is exposed; and, in response generates an updated set of stimuli to the aircraft. The system also records the response of the output responses of aircraft components so that they could be monitored by personnel charged with insuring that the aircraft is functioning properly. The system can also be used to train flight crews since it can be used to place the aircraft "in the loop" during a flight emulation.

22 Claims, 10 Drawing Sheets

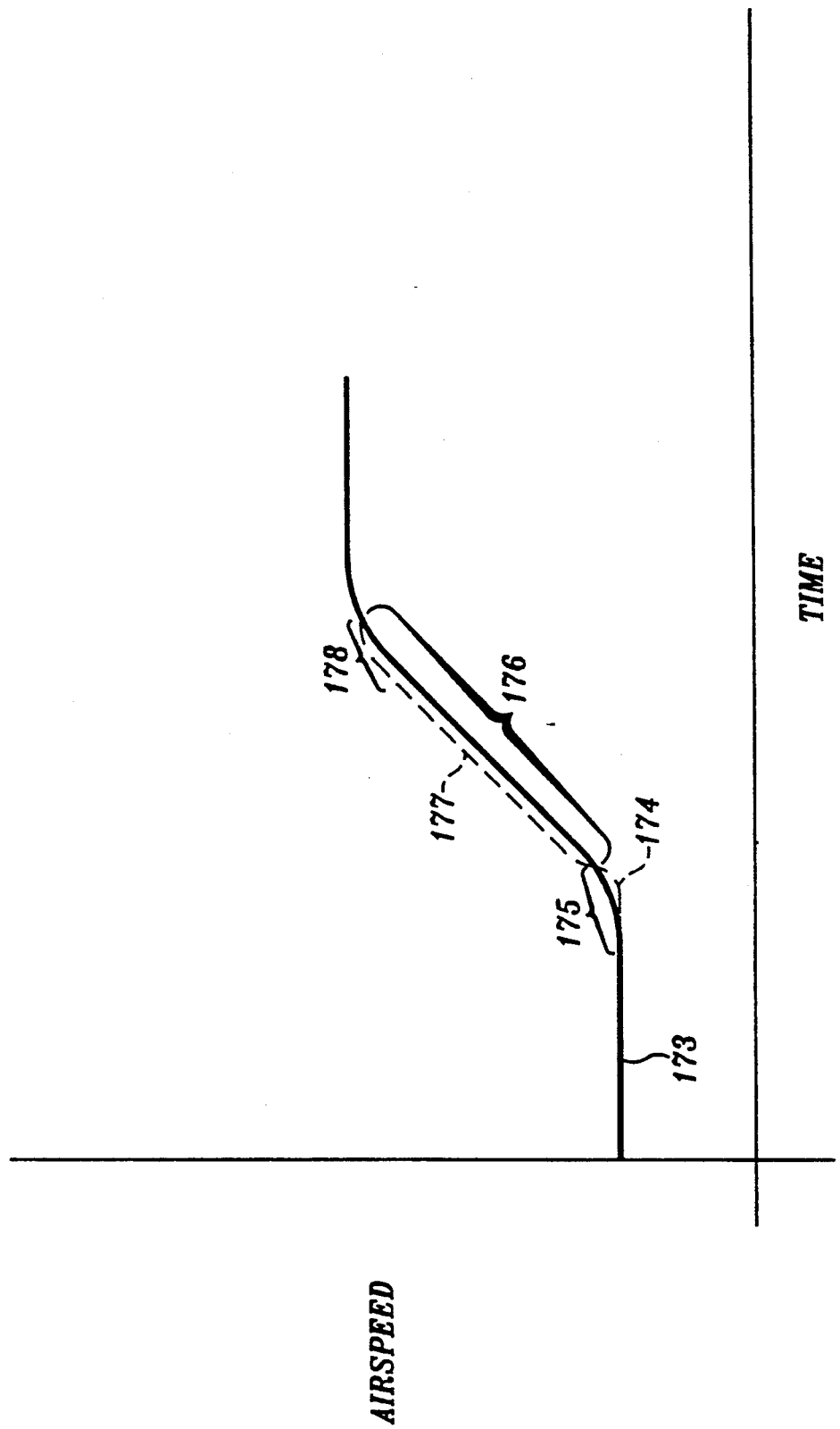

AIRCRAFT FLIGHT EMULATION TEST SYSTEM

This application is a continuation of application Ser. No. 07/577,853, filed Sept. 5, 1990, now abandoned.

FIELD OF THE INVENTION

This invention relates generally to aircraft test systems and, more particularly, systems for ground testing an aircraft by emulating flight conditions and testing the response to the emulation.

BACKGROUND OF THE INVENTION

An aircraft is an assembly of numerous interacting mechanical and electrical components that need to function properly for the aircraft to operate safely. An important step in the manufacture and maintenance of an airplane is the testing of the components in order to verify that they operate accurately and reliably. Almost all aircraft components are tested prior to installation in the aircraft. Most aircraft components should also be tested after installation to verify that they function properly in conjunction with the other components to which they are connected. This testing is necessary to verify that the aircraft, as an assembly of interacting components, will function properly when in flight.

Conventional testing of aircraft components relies on either flight testing of the aircraft or system testing when the aircraft is on the ground. Flight testing, as the name implies, involves actually flying the aircraft in order to ensure that its various components operate properly with respect to each other. Flight testing, while useful, has limitations. In flight testing it is difficult, if not impossible, to expose an aircraft to all conditions and events to which it might be exposed in order to observe how the components will respond. For example, environmental conditions such as sudden cross winds cannot be developed on command. Also, complex aircraft, such as modern commercial airliners, comprise a large number of components that are assembled into numerous systems. These components and systems must be subjected to numerous test procedures in order to ensure that they function properly. It is neither an efficient use of time nor resources to repeatedly flight test an aircraft solely to ascertain whether a specific assembly of components are performing satisfactorliy. Moreover, a number of test procedures involve verifying the proper operation of aircraft under potentially threatening conditions such as low altitude, high wind conditions. Testing the in-flight response of an aircraft to these conditions and events has the potential of jeopardizing the safety of both the aircraft and the flight crew.

The alternative to flight testing an aircraft is ground testing. This involves applying input signals to the components of a grounded aircraft and monitoring the response. Conventional ground testing equipment is typically only useful for testing the components forming one or two specific aircraft systems. For example, some ground test equipment is useful for testing an aircraft's radio navigation equipment. However, this equipment is of little value for testing the performance of other aircraft components in response to information from both the radio navigation equipment and the aircraft inertial reference navigation equipment. Moreover, many conventional ground test systems can only be used to test some of the components that form only part of a specific aircraft system. For example, some ground test equipment is only useful for testing aircraft components that respond to the signals produced by the pressure-sensitive altimeter; this equipment cannot be used to test the actual pressure-sensitive elements of the altimeter. Therefore, this equipment is not particularly useful for testing an altimeter system so as to observe how the whole system, and the components to which it is connected, function as an integrated system. Consequently, ground testing is of limited value for observing how the components and systems that form an aircraft will function together when the aircraft is in flight.

SUMMARY OF THE INVENTION

This invention relates generally to an aircraft test system for concurrently ground testing a number of aircraft components so as to be able to observe how the components will function together when the aircraft is in flight. More particularly, this invention relates to a test system that generates stimuli to which an aircraft would be exposed to in flight; monitors the response of the aircraft to the stimuli; and, based on the response of the aircraft, generates an updated set of stimuli equal to what the aircraft would be exposed to as it moves through the air. The test system of this invention also includes a set of instruments for recording the response of the aircraft components to the in flight stimuli to determine whether or not the components are functioning properly.

The aircraft flight test system of this invention includes a number of stimuli generating instruments for producing signals the various components the aircraft would normally receive when the aircraft is in flight. The stimuli generating instruments include radio frequency signal generators for generating radio frequency navigation signals representative of the signals normally received when the aircraft is airborne. Other stimuli generating instruments produce signals representative of signals normally produced by some components of the aircraft and monitored by other components. In a preferred embodiment of the invention, for example, stimuli generators produce signals representative of the output of on-board inertial navigation reference units. The test system of this invention also includes a set of mechanical and/or pneumatic actuators for stimulating the mechanically driven and/or pressure-driven aircraft transducers. In a preferred embodiment of the invention, for example, the system includes a set of air pumps that supply air flows to the airspeed and barometric altimeter transducer that are identical to the air flows measured when the aircraft is in flight. The test system also includes measuring and recording devices for monitoring and establishing a record of the response of the aircraft to the stimuli.

The stimuli generating instruments are all controlled by a central processing unit. The instruments that monitor and measure output signals from the aircraft components are also connected to the central processing unit. The central processing unit directs the stimuli generating instruments to generate stimuli that emulate the stimuli received by an airborne aircraft. When the stimuli are applied to the aircraft, the system measuring instruments monitor the aircraft components for both a response to the stimuli from the aircraft components and for flight crew commands issuing from the cockpit. The central processing unit analyzes the output signals from the aircraft components and from the actuation of any cockpit controls. In response to this information, the stimuli generating instruments are instructed to produce an updated set of stimuli equal to the stimuli that would be received if the aircraft was moving through the air. The central processing unit also records the output data from the aircraft components so that the performance of components can be analyzed and the origin of any faults can be quickly located.

The aircraft test system of this invention is used to place an aircraft "in the loop" of a flight emulation environment. This makes it possible to observe the in-flight response of the aircraft components and the aircraft systems formed by the components when the aircraft is on the ground. The system thus minimizes the amount of actual flight test time required to ensure that all the components comprising a particular aircraft are functioning properly and that the aircraft can be flown safely. Another advantage of the system is that aircraft components or systems can be repeatedly subjected to a single test in a minimal amount of time. This further minimizes both the amount of time and the costs associated with having to run near-duplicate tests that are often needed to verify that a component is functioning properly, or that are run to identify the source of a component fault. Still another advantage of this system is that it can be used to generate stimuli equal to almost any stimuli to which the aircraft may be exposed in flight. The system thus essentially eliminates the need to schedule aircraft testing around the expectation that the right test conditions will develop. Moreover, the system is capable of generating stimuli to which the aircraft may only otherwise be exposed in relatively dangerous situations. This makes it possible to test the response of the aircraft components and systems to this type of stimuli when the aircraft is safely located on the ground.

Flight crews can also be trained using the test system of this invention. The system responds to actuation of the aircraft cockpit controls by generating stimuli to which the aircraft would normally be exposed in flight due to the in-flight manipulation of the controls. Thus, the test system of this invention can be used in combination with an aircraft to emulate the in-flight experiences to which a flight crew may be exposed so as to minimize the amount of actual flight training that is required.

BRIEF DESCRIPTION OF THE DRAWINGS

The above and further advantages of the invention may be better understood by reference to the following detailed description of a preferred embodiment of the invention when taken in conjunction with the accompanying drawings, in which:

FIG. 7 is a graphic depiction of how output stimuli from an air data test conducted in accordance with this invention can lag commands to adjust the production of stimuli and how an air data predictor equation is used to compensate for the lag.

DETAILED DESCRIPTION OF THE PREFERRED EMBODIMENT

Figure 1:
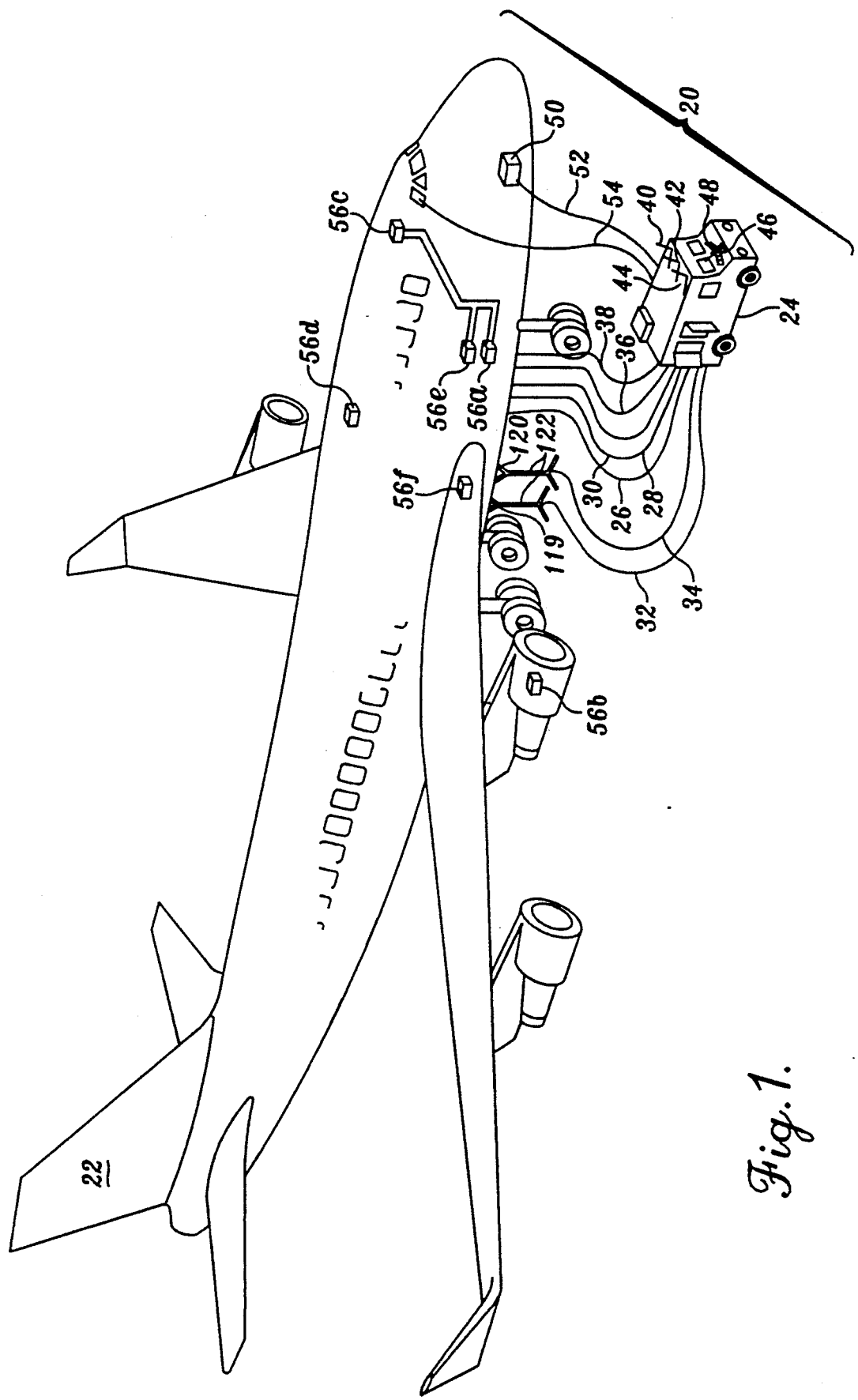
FIG. 1 is a perspective and partial cutaway view illustrating how an aircraft test system formed in accordance with this invention is connected to an aircraft in order to simulate flight testing.

FIG. 1 depicts an aircraft test system 20 formed in accordance with this invention connected to an aircraft 22. The system 20 comprises instruments that generate stimuli normally received by the components of the aircraft 22 when in flight, plus other instruments that monitor the response of the aircraft components. The system 20 instruments are contained in a van 24 that can be parked adjacent to the aircraft 22. The van 24 is provided with a number of cables 26-34 that provide a conductive path for exchanging electrical signals between the aircraft 22 components and the system 20 instruments. Air flows having characteristics identical to the air flows measured through the aircraft pitot and static ports are supplied by the system through pneumatic hoses 36 and 38. The system 20 exchanges radio signals with radios on board the aircraft 22 through a set of antennae 40-48 mounted to the outer body of the van 24. Angle-of-attack sensor vanes on the aircraft 22 (not illustrated) are moved by separate angle-of-attack vane actuators 50, one shown, that are also part of the system 20. The angle-of-attack vane actuators 50 are connected to the van 24 by separate cables 52 (one shown). Personnel in the cockpit of the aircraft 22 can control the tests performed by the system 20 through a portable terminal, not illustrated in this figure, that is connected to the van 24 by an operator interface cable 54.

The aircraft 22 is a conventional modern commercial airliner. The aircraft 22 has a number of line-replaceable units (LRUs) 56a, b, c, . . . that control and/or monitor the operation of individual components or subsets of components that form the aircraft. The LRUs 56 communicate with each other, and in some instances with individual components, over a set of communication busses 58, one shown, that are also part of the aircraft 22. FIG. 1 illustrates a number of exemplary LRUs 56. An air data computer (ADC) 56a monitors the static and dynamic air pressures to which the aircraft 22 is exposed and generates signals representative of the dynamically measured altitude and airspeed of the aircraft 22. An electronic engine control 56b, one shown, is connected to each engine for monitoring and controlling the operation of the engine.

A flight control computer 56c serves as the autopilot for the aircraft 22. A flight data acquisition unit 56d monitors the heading, altitude and other aircraft state parameters, the actuation of the cockpit controls, and transmits selected data to the aircraft flight recorder for storage. An inertial reference navigation unit 56e comprises a set of transducers that produce a set of signals that represent changes in the acceleration of the aircraft 22. The measure of acceleration is used by other components of the aircraft to determine the distance the aircraft 22 has flown from an initial location. A low range radio altimeter 56f emits radio signals directed towards the ground and monitors how long it takes for the signals to be reflected back to the aircraft 22 in order to measure the above-ground height of the aircraft. Other LRUs, not illustrated, control the actuation of the aircraft 22 control surfaces, monitor the state of the various internal systems of the aircraft, and actuate the audio and visual annunciators and alarms in the cockpit. When the aircraft 22 is in flight, the LRUs 56 communicate with each other and/or with the components to which they are connected in order to control the operation of the aircraft.

Figure 2:
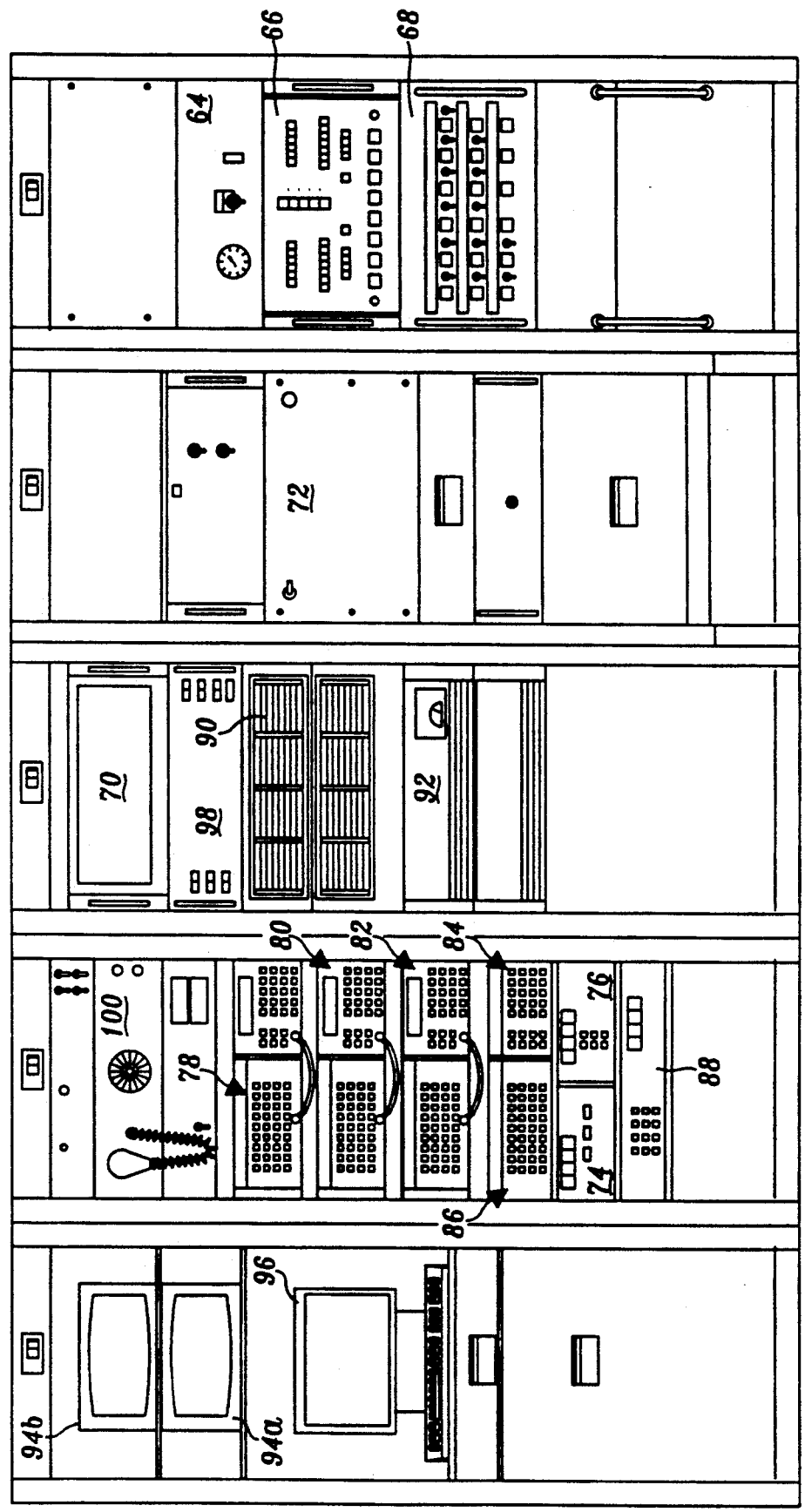
FIG. 2 is a front view depicting the instruments and central processing unit of the test system illustrated in FIG. 1.

FIG. 2 depicts the test system instruments housed in the van 24 that generate stimuli and monitor the response of the aircraft 22 to the stimuli. A set of pumps 64 generates the air flows that are measured by the pressure-sensitive altimeters and air speed sensors on board the aircraft 22. The output of the pumps is regulated by an air data test unit 66 so the air flows have characteristics that are identical to the air measured by the aircraft 22 when in flight. A manifold controller 68 controls the discharge of the air from the pumps 64 to the pneumatic hoses 36 and 38 through a manifold, not illustrated in this figure. An angle-of-attack vane actuator controller 70 controls the angle-of-attack vane actuators 50.

An inertial navigation simulator 72 generates signals that are identical to those produced by the aircraft inertial reference navigation unit 56e. In some preferred embodiments of the test system 20, the inertial navigation simulator 72 is capable of generating signals representative of the output of multiple inertial navigation reference units 56e since many aircraft are provided with multiple units. A flight data reader 74 is connected to a bus on the aircraft 22, not illustrated, over which data from the flight data acquisition unit 56d is transmitted to the aircraft 22 flight recorder. In a preferred embodiment of the test system 20, the flight data reader 74 is an interface unit for connection to an aircraft ARINC 717 data bus which is the type of bus used to link a flight data acquisition unit 56d to a flight data recorder. The test system 20 also includes a data transceiver 76 that is connected to the bus 58 to which most of the aircraft LRUs 56a, b, c . . . are connected. The data transceiver 76 exchanges information with the LRUs 56a, b, c . . . that emulate the information exchanged when the aircraft 22 is in flight. In a preferred embodiment of the invention, the data transceiver 76 is capable of transmitting and receiving data normally exchanged over an ARINC 629 bus which is a common inter-LRU bus used in commercial aircraft.

A set of transmitting signal generators 78, 80 and 82 generate radio signals identical to the radio navigation signals normally received by the aircraft 22. In a preferred embodiment of the invention, one signal generator 78 is capable of generating VHF navigation signals (VOR signals) or low frequency marker beacon signals; another signal generator 80 is capable of generating instrument landing glide slope signals; and, a further signal generator 82 is capable of generating instrument landing localizer signals. An engine performance signal emulator 84 produces signals identical to the performance signals transmitted from the engines to the cockpit. In a preferred embodiment of the invention, the engine performance signal emulator 84 produces frequency modulated signals that emulate the engine-produced signals that indicate the revolutions per minute of the primary (N1) engine rotors.

The system 20 includes a radio altimeter signal emulator 86 that emits signals identical to those received by the aircraft 22 low range radio altimeter when in flight. The radio altimeter signal emulator 86 receives the ground interrogation signals emitted by the aircraft low range radio altimeter 56f and, after a time period equal to the in-flight propagation time of the signals, transmits a return signal to the altimeter. Some radio altimeter signal emulators 86 retransmit the emitted signal after an appropriate delay cycle. Other radio altimeter signal emulators 86 transmit an internally generated return signal in response to the receipt of an interrogation signal. The specific radio altimeter signal emulator 86 provided with the system 20 depends, in part, on the type of low range radio altimeter 56f in the aircraft 22 which the system is employed to test. A transponder interrogator 88 queries and monitors the response of a radar transponder on board the aircraft 22.

The system 20 instruments are all connected to and controlled by a central processing unit 90. Integral with the central processing unit 90 is a memory 92 for storing sets of programmed instructions that control the operation of the test system instruments and for storing the data received from the aircraft 22. The memory 92 contains a hard disk, not illustrated, that functions as a permanent memory for the system instructions and test results. A pair of touch-screen display terminals 94a and 94b are connected to the central processing unit 90 to allow an operator to interact with the system 20. One terminal, terminal 94a, is permanently located inside the van 24. The second terminal, terminal 94b, is the portable terminal connected to the operator interface cable 54 that is used by personnel in the aircraft 22 to control the execution of tests by the system 20. A keyboard and display terminal 96 are also connected to the central processing unit 90. Keyboard/terminal 96 is used to monitor and maintain the processes that are executed on the central processing unit 90. An interface module 98 contains a set of interface boards 132–138, described and illustrated hereinafter, that link the system 20 instruments and the central processing unit 90. A low-powered transceiver 100 allows personnel in the van 24 to communicate with personnel in the aircraft 22.

Figure 3:
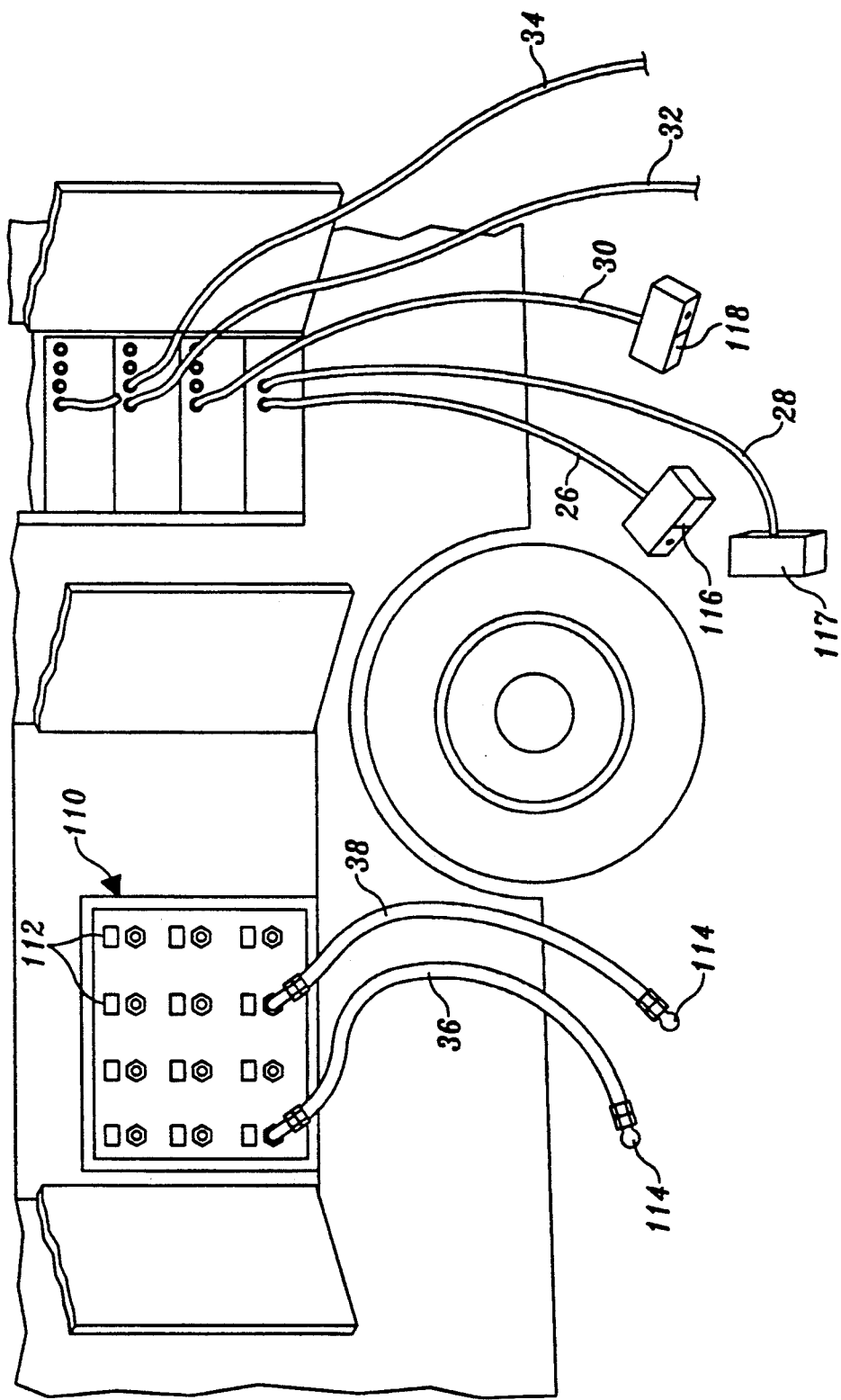
FIG. 3 is a side view of a van containing a test system formed in accordance with this invention illustrating the cables and hoses used to connect the system to an aircraft.

The physical links between the system 20 instruments of FIG. 2 and the aircraft 22 are described with respect to FIG. 3. The pneumatic hoses 36 and 38 extend from a manifold 110 in the van 24 to the aircraft pitot and static ports on the aircraft 22. The manifold 110 directs the air flows into the correct pneumatic hoses 36 and 38 so that the air will be introduced into the appropriate ports. The air flow through the manifold 110 is regulated by the manifold controller 68 or by switches 112 on the face of the manifold. The free ends of the pneumatic hoses 36 and 38 are provided with appropriate couplings 114 so that the hoses can be connected to the aircraft air intake ports.

The system data transceiver 76 exchanges data with the aircraft LRUs 56a, b, c, . . . over an ARINC data cable 26. Cable 26 is connected between the data transceiver 76 and a terminal, not illustrated, on the aircraft LRU bus 58 (FIG. 1). Cable 26 also includes a coaxial conductor, not illustrated, over which the signals are generated by the engine performance signal emulator 84 to the aircraft. The performance signals are supplied to a terminal that is connected to a bus on the aircraft 22 over which the signals are transmitted to instruments in the cockpit. The flight data reader 74 is connected to the in-aircraft flight data bus over cable 28. Signals from the inertial navigation simulator 72 are supplied to the aircraft over cable 30. The free end of the cable 30 is adapted to be plugged into a terminal in the aircraft that normally receives the signals produced by the inertial navigation reference unit 56e. In embodiments of the test system 20 used with aircraft 22 having multiple inertial navigation reference units 56e, cable 30 may be provided with multiple heads for connection to the different terminals to which the separate navigation units 56e are normally connected. The heads of cables 26, 28, and 30 are provided with appropriate connectors 116, 117 and 118 respectively for establishing both mechanical and conductive links to complementary terminals on the aircraft 22.

The test system 20 exchanges signals with the low-range radio altimeter 56f through cables 32 and 34. Signals emitted by the aircraft low-range radio altimeter are received by an antenna 119 (FIG. 1) attached to the head of cable 32 and are transmitted to the van 24. Signals emitted by the radio altimeter signal emulator 86 are transmitted over cable 34, and radiated over an antenna 120 attached to the head of the cable. The antennae 119 and 120 are mounted on stands 122 so that they can be positioned directly underneath the aircraft low-range radio altimeter antennae, (aircraft antennae not illustrated). When the system 20 is not in use the cables 26–34 and pneumatic hoses 36 and 38 are stored inside the van 24.

Figure 4:
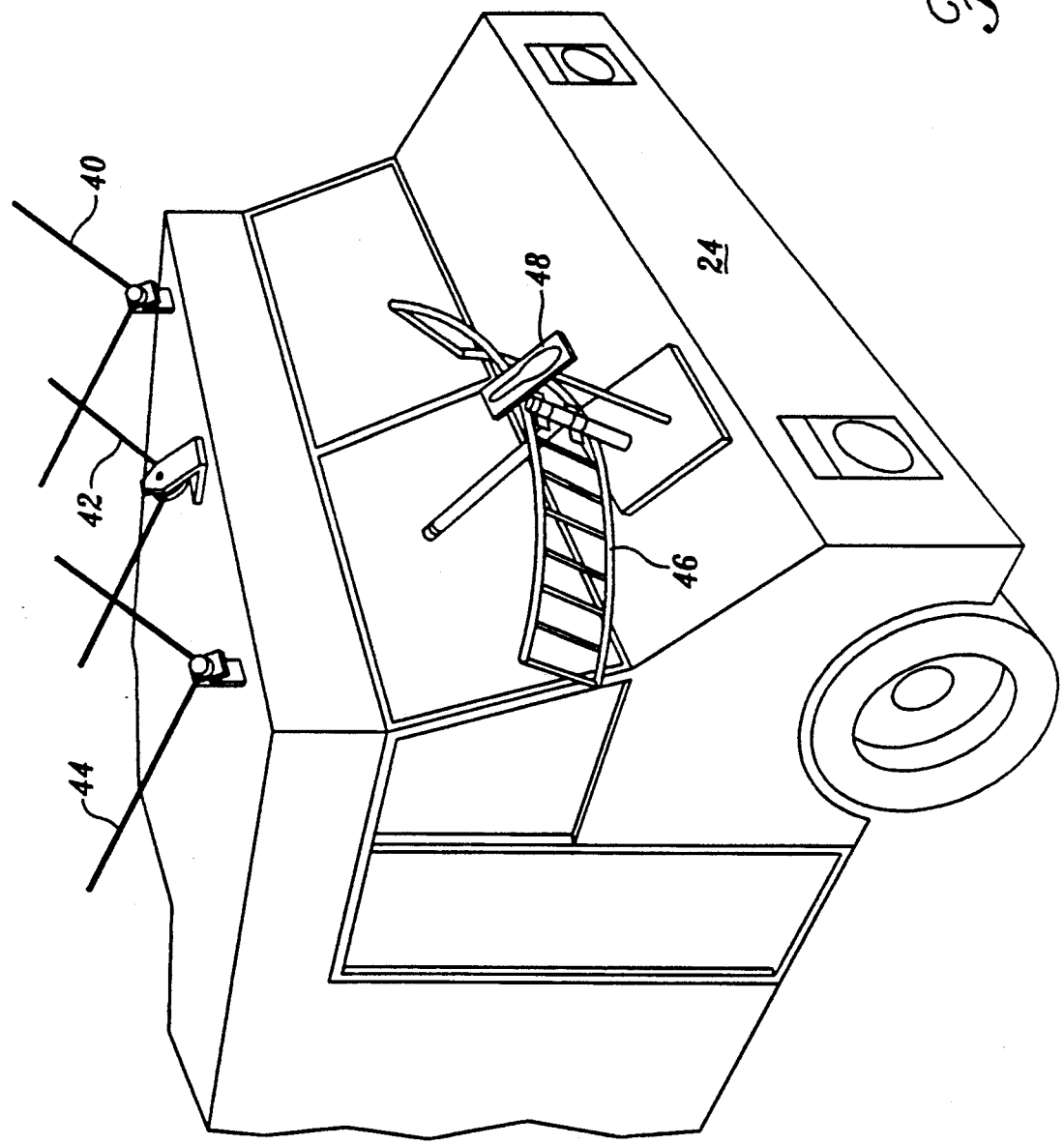
FIG. 4 illustrates the antennae of a test system formed in accordance with this invention.

FIG. 4 illustrates in detail the system antennae 40–48 over which radio signals are exchanged with the aircraft 22. Three "rabbit ear" VHF antennae, 40, 42 and 44, for transmitting navigational and instrument landing signals are mounted to the roof of the van 24. A parabolic antenna 46 is mounted to the front of the van 24 for exchanging signals between the aircraft transponder and the system transponder interrogator 88. Marker beacon signals are transmitted by the system 20 to the aircraft from a low-frequency antenna 48 also mounted to the front of the van 24 adjacent the parabolic antenna 46.

Figure 5:
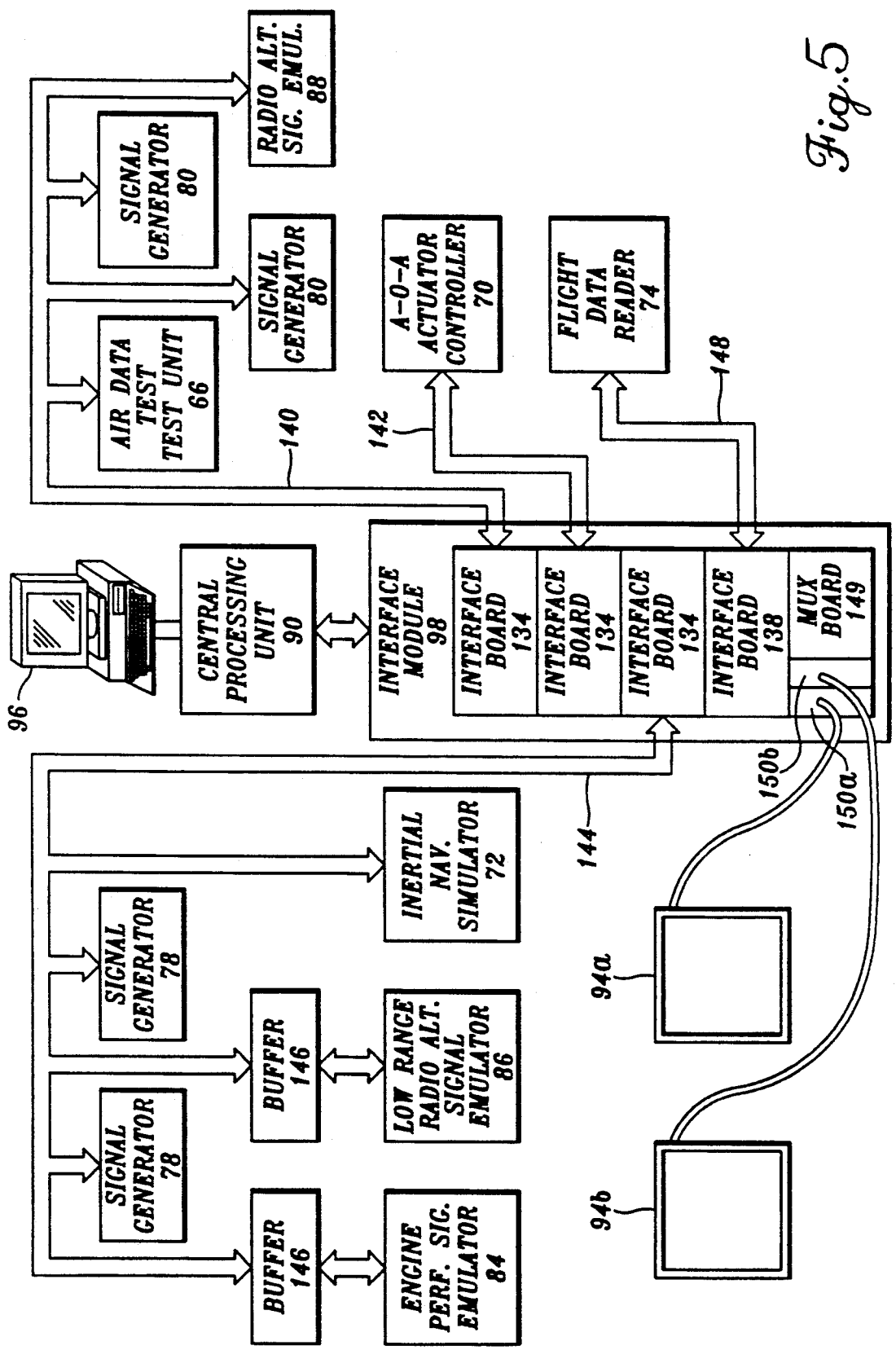
FIG. 5 illustrates in block diagram form the connections between the system instruments and central processing unit of a test system formed in accordance with this invention.

As depicted in FIG. 5, the interface module 98 includes a set of interface boards 132–138, each of which is connected between the central processing unit 90 and a specific set of system 20 instruments. Multiple interface boards 132–138 are provided because physical and electrical constraints limit the number of instruments that can be connected to each board and associated signal bus. In the illustrated embodiment of the invention, one interface board, board 132, serves as the interface to the air data test unit 66, the signal generators 80 and 82 that produce glide slope and localizer signals and the radio altimeter signal emulator 86. A first interface bus 140 connects this interface board 132 with the instruments with which the board is associated. A second interface board, board 134, exclusively serves as the interface between the central processing unit 90 and the angle of attack vane actuator controller 70. This single connection is required because the reset commands frequently sent to the angle of attack vane actuator controller 70 would disrupt the operation of other system 20 instruments if transmitted over a common bus. The second interface board 134 and the angle of attack vane actuator controller 70 are connected by a second interface bus 142.

The signal generator 78 that produces the VHF and low frequency navigation signals, the data transceiver 76, the engine performance signal emulator 84, the inertial navigation simulator 72, and the radio altimeter signal emulator 86 are connected to the central processing unit 90 through the third interface board 136. The above-listed instruments are connected to the third interface board 136 by a third interface bus 144. Separate data buffers 146 are connected between the third interface bus 144, the engine performance signal emulator 84 and low range altimeter signal simulator emulator 86. The data buffers 146 provide temporary storage for the commands from the central processing unit 90 since the central processing unit can occasionally generate commands faster than they can be responded to by the low-range altimeter signal emulator 86 and the engine performance signal emulator 84. The flight data reader 74 is connected to the central processing unit through a dedicated interface board 138 and a dedicated bus 148. In a preferred embodiment of the invention, data is received by interface board 138 in the serial form that is used in the aircraft 22. A serial-to-parallel converter, not illustrated, integral with interface board 138 then converts the data into a parallel form for processing by the central processing unit 90.

A multiplex board 149, which also forms part of the interface module 98, links the touch screens 94a and 94b to the central processing unit 90. The multiplex board 149 has a number of ports 150a, 150b, respectively, to which the individual touch screens 94a and 94b, respectively, are connected. The multiplex board 149, in response to commands from the central processing unit 90, "listens" for incoming signals from one of the touch screen terminals 94a and 94b, and forwards the commands to the central processing unit. Alternatively, the multiplex board 149 scans the touch screen terminals 94a and 94b, and forwards any commands that have been entered through either terminal to the central processing unit 90. Keyboard/terminal 96, which is used to access and monitor the processes that are executed by the central processing unit 90, is connected directly to the central processing unit.

Figure 6:
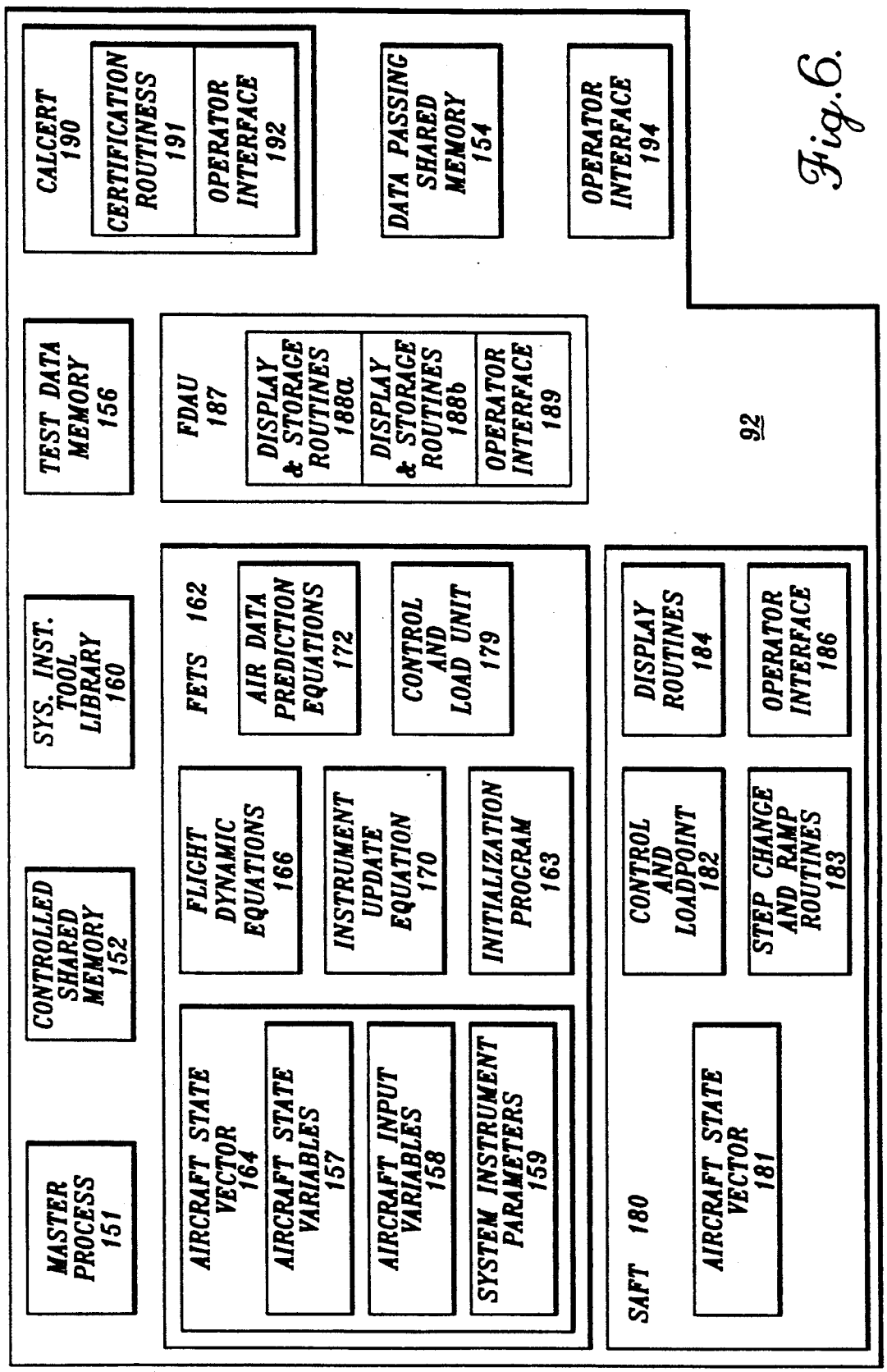
FIG. 6 depicts as individual modules the various software processes run on the central processing unit of a test system formed in accordance with this invention.

The program that runs on the central processing unit 90 to control the operation of the system 20 is depicted in FIG. 6 as a plurality of separate modules that are stored in the central processing unit memory 92. Also depicted are the primary shared memory sections that are accessed during the running of the system 20. A master control program, represented by process 151, controls the initiation and termination of all process programs run on the central processing unit 90. The master process 151 receives the operator-initiated requests to perform specific tests using the system 20, and in response, controls the execution of another process program that performs the desired tests. The master process 151 is also responsible for the creation and maintenance of the communication pathways between the process programs running on the central processing unit 90 and the memory sections (pathways not shown).

A controlled shared memory 152 contains process state information that is used to control the execution of process programs that are run on the central processing unit 90. The contents of the controlled shared memory 152 include: the status of process programs that are being executed by the central processing unit 90; the status of the system 20 instruments; inter-process commands and data relevant to the execution state of those commands; and, commands and process state data that are exchanged between the central processing unit 90 and the terminals 94a, 94b and 96.

A data passing shared memory 154 contains application-related data used by the process programs running on the central processing unit to control the application of stimuli by the test system 20. The central processing unit memory 92 also contains a system instrument tool library 160. The system instrument tool library 160 contains a set of instrument tools and drivers that are used to control the operation of the system instruments. For example, one set of tools and drivers is used to control the glide slope signals produced by signal generator 80. Another set of tools and drivers controls the data produced by the data transceiver 76. The process programs run on the central processing unit 90 control the operation of the system instruments by selectively invoking the individual instrument tools and drivers to produce the desired stimuli or make the correct measurement from the designated instrument.

The data received by the system 20 from the aircraft 22 is stored in a test data memory 156. The test data memory 156 contains records of the measurements made by aircraft components, and records commands and messages that are exchanged between the aircraft components. After system flight emulation is completed, the contents of the test data memory 156 can be analyzed to review the performance of the aircraft 22 and/or flight crews that are being trained with the aid of the system. In a preferred embodiment of the invention, the test data memory 156 is located on the memory 92 hard disk.

A flight emulation test system (FETS) program 162 controls the "closed loop" flight emulation testing of the aircraft 22 by the system 20. The flight emulation test system program 162 controls the running of a test by reference to an aircraft state vector 164. The aircraft state vector 164 includes a set of aircraft state variables 157, each of which describes a specific attribute of the aircraft 22 when in flight. The attributes of the aircraft 22 describes by the state variables 157 include: the inertial variables including the aircraft's horizontal and vertical speed and acceleration; the attitude variables, pitch yaw and roll; altitude; and, position. A set of aircraft input variables 158 describe attributes of the aircraft that cause one or more of the aircraft state variables to change as the aircraft moves through the air. The aircraft input variables 158 include the state of the aircraft control surfaces, the engine throttle settings and relevant data about other aircraft components that can cause the state of the aircraft to change. The aircraft state vector 164 also includes a set of system instrument input parameters 159. The system instrument input parameters 159 describe the attributes of specific system stimuli generating instruments and the information monitored by a specific system measuring instrument. For example, one system instrument input parameter describes the signal produced by the glide slope signal generator 80 and another input parameter describes the last set of aircraft control surface commands that were received through the data transceiver 76.

The flight emulation test system program 162 functions by initially updating the aircraft state variables 157 based on the initial aircraft state variables 157 and the aircraft input variables 158. The flight emulation test system program then updates the system instrument input parameters 159 based on the updated aircraft state variables 157 and then directs the system 20 instruments to apply an adjusted set of stimuli to the aircraft based on the updated system instrument input parameters 159.

The flight emulation test system program 162 contains a set of flight dynamics equations, represented by module 166, for updating the aircraft state variables in the aircraft state vector 164. The flight dynamics equations 166, which are based on the equations of motion, are a set of equations that describe the state changes of the aircraft 22 over time. For example, airspeed variables are updated based on the initial acceleration variables. The acceleration variables are updated based on the aircraft engine performance which is indicated by the engine throttle settings. A first set of flight dynamics equations 166 is used to calculate the changes in the initial aircraft state variables 157. A second set of flight dynamics equations 166 integrates the changes into the initial aircraft state vector to produce the updated aircraft state variables 157 (individual sets of flight dynamics equations not illustrated).

The flight emulation test system program 162 further includes a set of instrument update equations, represented by module 170, and a set of air data predictor equations, represented by module 172. The instrument update equations 170 are used to calculate the system instrument input parameters 159 that control the stimuli that are applied to the aircraft 22. The instrument update equations 170 model the electronic navigation signals that would be received by the aircraft 22 when in flight. These signals include: the navigation signals that indicate the latitude and longitude of the aircraft; the glide slope and localizer signals; and, the low range radio altimeter signals that would be received by the aircraft. The input variables into the navigation equations are the updated aircraft state variables 157, the aircraft input variables and the initial system instrument input parameters.

The air data predictor equations 172 are used by the flight emulation test system 162 to produce the system instrument input parameters 159 that control the stimuli produced by the air data test unit 66 (FIG. 2). This is because the air data test unit 66 may initially be unable to produce pneumatic stimuli that change as fast as the aircraft altitude and air speed can change. The air data predictor equations 172 are used to produce a set of adjusted air speed and altitude values to compensate for a lag in the rate the pneumatic stimuli applied to the aircraft change.

An understanding of the implementation of the air data predictor equations 172 can be gained by discussion of the origins of the airspeed predictor equation which is made with reference to FIG. 7. As seen in this figure, solid line 173 represents an exemplary "actual" airspeed versus time profile for a portion of a flight of the aircraft 22. The change in velocity as the aircraft moves through the air is:

$$V_{t+1} = V_t + \Delta v \qquad (1)$$

where: $V_t$ is the airspeed of the aircraft 22; $\Delta v$ is the change in velocity per unit time, the acceleration of the aircraft; and, $V_{t+1}$ is the updated airspeed at time $t+1$. Ideally, the stimuli applied from the air data test unit 66 should always change at a rate of change equal to the acceleration of the aircraft. However, physical and mechanical constraints of the air data test unit 66 cause the stimuli applied to the aircraft 22 to initially change at a rate less than the acceleration rate. If the air data test unit 66 is directed to apply stimuli that change at a rate equal to the acceleration of the aircraft 22, the stimuli would initially not change at a rate equal to the acceleration as represented by dotted line 174. The system 20 instruments designed to monitor the performance of the air data computer 56a would then indicate a failure to accurately measure the changes in airspeed. This indication would be erroneous because the air data computer 56a, would, in fact, be correctly indicating the airspeed based on actual applied stimuli.

The airspeed predictor equation is used to produce an adjusted airspeed value, $Va_{t+1}$, to compensate for the initial lag in ability of the air data test unit 66 to produce stimuli representative of changing airspeeds. The airspeed predictor equation solves for the adjusted updated airspeed based on the initial airspeed and the acceleration rate of the aircraft multiplied by constant, K, that is greater than one. Mathematically, the basic equation is:

$$Va_{t+1} = V_t + K \Delta v \qquad (2)$$

The large acceleration component causes the adjusted updated airspeeds to initially change faster than the actual acceleration rate. The rapidly changing adjusted airspeed values are used by the flight emulation test system to control the production of stimuli. The commands to produce rapidly changing stimuli offsets the lag in the ability of the air data test unit 66 to initially change the stimuli, so that the actual change approximates the in-flight rate of change of the stimuli.

In some preferred embodiments of the invention, at low acceleration rates the air data test unit 66 can produce stimuli that accurately track changes in airspeed. In these embodiments of the invention, before the airspeed predictor equation is executed, a decision comparison is made to determine whether or not it is necessary to base the application of the stimuli on an adjusted airspeed. This comparison is made by determining if the calculated acceleration of the aircraft 22 is below the rate at which the air data test unit 66 is capable of producing stimuli that accurately represent changing airspeeds. Mathematically, the decision comparison is represented as:

$$|\Delta v| < Q \qquad (3)$$

where Q is a maximum acceleration rate, an implementation rate, that the air data test unit can nearly instantaneously emulate. If the absolute acceleration rate is less than the implementation rate, the actual updated airspeed is used by the flight emulation test system 162 to control the application of stimuli by the air data test unit 66. If the absolute acceleration rate is equal to or greater than the implementation rate the airspeed predictor equation is invoked for execution. The flight emulation test system 162 then directs the air data test unit 66 to apply stimuli representative of the adjusted updated airspeed attribute to the aircraft 22.

In embodiments of the invention where the comparison is made in order to determine if the airspeed lag equation will be invoked, the equation may be adjusted. This adjustment is made to eliminate a discontinuity in the stimuli produced if the airspeed lag equation was suddenly invoked to produce airspeed variables for controlling the air data test unit 66. One means of adjusting the airspeed lag equation is to reduce the acceleration variable by an amount equal to the implementation rate. The adjusted airspeed lag equation is:

$$Va_{t+1} = V_t + K(\Delta v - Q) \qquad (4)$$

When the aircraft 22 is at a constant airspeed or below the implementation rate, the air data test unit 66 is capable of producing stimuli that emulate the in-flight stimuli applied to that aircraft. In this state, the air data predictor equations 172 airspeed predictor is not used to produce an adjusted airspeed value and the instrument update equations 170 calculate the updated system instrument airspeed input parameter with reference to the basic, calculated airspeed state value. When the aircraft acceleration rate rises above the implementation rate, the airspeed predictor equation is used to produce an adjusted airspeed value. The instrument update equations 170 then use the adjusted airspeed value to calculate the system instrument input parameter 159 that is used to control the production of stimuli by the air data test unit 66. Consequently, the stimuli produced by the air data test unit 66 approximate the actual stimuli the aircraft would be exposed to in flight as represented by section 175 of line 173.

Once the aircraft acceleration rate stabilizes, as represented by section 176 of line 173, the adjusted updated airspeed leads the updated speed by a small fixed amount, represented by dot and dash line 177. The difference is fixed because the airspeed predictor equation is executed with reference to the previous airspeed variable, not the previously calculated adjusted updated airspeed. Thus, once a constant acceleration rate has been reached, the adjusted airspeed will change at a rate equal to the aircraft acceleration rate. The only difference will be the slight lead (exaggerated for purposes of illustration) between the adjusted and actual airspeed values, owing to the difference in the relative acceleration rates. This difference between the stimuli applied to the aircraft, measured by the air data computer 56a, and the actual airspeed vector is small enough that it does not affect the performance of the various parts of the aircraft 22 the system 20 monitors.

The airspeed predictor equation is executed until the flight dynamics equations indicate that the acceleration has slowed to below the implementation rate at which time the airspeed predictor equation is no longer invoked to produce adjusted updated airspeed values. As represented by section 178 of line 177, the airspeed predictor equation may momentarily cause stimuli to be produced to indicate the aircraft 22 is decelerating more rapidly than the actual rate. This "slow up" rate does not appreciably affect the operation of the system 20.

In addition to the airspeed predictor equation, the air data predictor equations 172 includes an altitude predictor equation. The altitude predictor equation is used to produce an adjusted altitude value which compensates for the inability of the air data test unit 66 to initially change the applied stimuli as fast as the altitude of the aircraft can change. This equation is invoked when the "actual" aircraft altitude variable changes faster than the initial rate at which the air data test unit 66 is able to change the stimuli applied to the aircraft 22. Specifically the altitude predictor equation is invoked whenever:

$$|\Delta h| < S \qquad (5)$$

where $\Delta h$ is the calculated rate height change, or vertical airspeed and S is the maximum vertical speed rate the air data test unit can initially emulate through the production of changing stimuli. The actual altitude predictor equation is:

$$Ha_{t+1} = H_t + W(\Delta h - S) \qquad (6)$$

where $H_t$ is the altitude at time t, $Ha_{t+1}$ is the adjusted altitude value at time t+1, and W is the constant upon which the vertical speed is increased. Thus, when the system 20 is in operation, the adjusted altitude values have the same relationship to the actual altitude variable as the adjusted airspeed values have to the actual airspeed variables as depicted in FIG. 7.

In a preferred embodiment of the invention, the airspeed predictor equation is not invoked if the absolute horizontal acceleration rate is below approximately .064 ft/sec². The constant K, upon which the initial acceleration is reduced, is approximately 50 if horizontal acceleration is calculated in units of gravity, 32 ft/sec². The altitude predictor equation is not invoked if the absolute vertical airspeed is below approximately 0.1667 ft/sec. The constant W, upon which the vertical speed of the aircraft is adjusted, is approximately 4.5 if vertical airspeed is calculated in ft/sec. These values will vary with the ability of the air data test unit 66 to rapidly apply changing stimuli to the aircraft 22.

The flight emulation test system program 162 also includes a control and load unit represented by module 179. The control and load unit 179 directs the system 20 stimuli generating instruments to adjust the stimuli that are applied to the aircraft 22 based on the updated system instrument input parameters 159 for those instruments. The control and load unit 179 sets and resets the output of the system 20 stimuli generating instruments by invoking the appropriate tools and drivers in the instrument tool library 160. The system 20 stimuli generating instruments are then reset with respect to the updated system instrument input parameters 159 for the stimuli generating instruments. The control and load unit 179 further reads the output data from the system 20 measuring instruments and updates the aircraft input variables 158 which describe the measurements made from those instruments.

The flight emulation test system program 162 further includes an initialization program, represented by module 163. The initialization program 163 controls the initial production of stimuli by the test system 20 when the flight emulation test system program 162 is first activated.

When the system 20 is used to emulate a flight test, the flight emulation test system program 162 repeatedly updates the aircraft state vector 164 and resets the system 20 stimuli generating instruments. The period of time in which the aircraft state vector 164 is updated and the stimuli generating instruments are reset is referred to as a flight emulation frame. In a preferred embodiment of the invention, as will be described hereinafter, the time periods of the individual flight emulation frames will vary with the average time period the flight emulation frames being approximately 20 milliseconds. The short average time period for the flight emulation frames allows the system 20 to produce stimuli that emulate the stimuli received by the aircraft 22 in flight.

A semi-automated flight test system, (SAFT) program, represented by module 180, allows an operator to manually control or monitor tests that are run by the system 20. The semi-automated flight test system program 180 contains a SAFT aircraft state vector 181 that contains the same aircraft variables and instrument input parameters of the FETS aircraft state vector 164, (individual components not illustrated.) A control and load unit 182, similar to the FETS control and load unit 179, is used direct the system 20 to adjust the stimuli applied to the aircraft 22 based on the SAFT aircraft state vector 181 instrument input parameters. The semi-automated flight test system program 180 further includes a set of step change and ramp routines, represented by module 183, that change the SAFT aircraft state vector 181 instrument parameters which control the stimuli applied to the aircraft 22. The step change and ramp routines 183 allow an operator to control the stimuli that are applied to the aircraft so that the response of the aircraft components to a particular set of stimuli can be observed.

The semi-automated flight test system program 180 is also used to control the display of aircraft component performance data when an aircraft 22 is being tested. The semi-automated flight test system program 180 has a set of display routines, represented by module 184, that control the real-time presentation of data on the touch screens 94a and 94b during the running of a test process. The display routines 184 selectively retrieve aircraft state variables 157 and/or system 20 instrument input parameters 159 from the data passing shared memory 154 and present the information on the touch screens 94a and 94b. This allows an operator, who knows generally that an aircraft component is malfunctioning, to simulate and monitor the in-flight performance of the component. When the data indicates the exact instant the component malfunctions, the test process can be stopped so that all input and output signals from the component can be reviewed in order to determine the exact cause of the malfunction.

The semi-automated flight test system program 180 further includes an operator interface 186 that allows an operator to select the specific step change and ramp routines 183 and/or display routines 184 that are invoked for execution. The operator interface presents a menu of stimuli change and display options on the touch screens 94a and 94b. The operator indicates the option selected for implementation by touching a specific section of the touch screen 94a or 94b.

A flight data acquisition unit (FDAU) program, represented by module 187, is used by the system 20 to monitor the performance of the aircraft flight data acquisition unit 56d. The flight data acquisition unit program 187 stores and reads the data received by the system flight data reader 74 from the aircraft flight data acquisition unit 56d. The flight data acquisition unit program 187 also collects data from the system instruments that is identical to the information the aircraft flight data acquisition unit 56d selected for storage by the aircraft flight recording. This allows personnel involved in testing the aircraft 22 to monitor the performance of the aircraft flight data acquisition unit 56d and flight data recorder. The flight data acquisition unit program 187 also controls the display of information retrieved by the aircraft flight data acquisition unit 56d and the information monitored off the system instruments simultaneously in real-time. This allows personnel to monitor the real time performance of the aircraft flight data acquisition unit 56d and flight data recorder so that sources of malfunctions can be precisely located.

The flight data acquisition unit program 187 includes two sets of display/storage routines, which are represented by modules 188a and 188b respectively. Display/storage routines 188a control the display and/or storage of data that is collected by the aircraft flight data acquisition unit 56d and received by the system flight data render 74. The first set of display/storage routines 188a also control the display and/or storage of data that is received from the system instruments connected to the other components of the aircraft 22. The second set of display/storage routines 188b primarily control the display and/or storage of data received from the aircraft components through the system data transceiver 76.

When the flight data acquisition unit program 187 is run on the central processing unit 90, selected aircraft flight data acquisition unit display/storage routines 188a are run simultaneously with matched display/storage routines 188b that retrieve the same type of data form the type system instruments. This allows real-time comparison monitoring of the performance of the aircraft flight data acquisition unit 56d and the flight data recorder. An operator interface module 189 allows personnel to select particular aircraft flight data acquisition unit 56d data collection for monitoring. The flight data acquisition unit program 187 can run simultaneously with the flight emulation test system program 162. In this mode, the flight data acquisition unit program 187 is used to verify that the aircraft flight data acquisition unit 56d will property record, read and select aircraft data for recording when in flight. The operator selects the desired display/storage routines 188a and 188b for execution through an operator interface 189 intergral with the system flight data acquisition unit 187.

A calibration and certification (CALCERT) unit program, represented by module 190, allows a technician to maintain and calibrate the system 20 instruments. The CALCERT unit program 190 contains a set of instrument certification routines, represented by module 191, that allow a technician to control the instruments through the central processing unit 90. This allows a technician to connect the system instruments to certification instruments so that the performance of the system instruments can be measured. Some instrument certification routines 191 include prompts that are displayed on the touch screen in order to guide the technician through the certification process. The instrument certification routines 191 may also include instructions that direct the central processing unit 90 and the certification instruments to which the system instruments are connected, to perform one or a number of certification tests on the system instruments. Still other instrument certification routines 191 may display operator prompts or processing unit instructions that facilitate the calibration of system instruments as well as their certification.

The CALCERT unit program 190 includes an operator interface, represented by module 192. The CALCERT operator interface 192 controls the display of information on the touch screens 94a and 94b required by the technician to control the running of the instrument certification routines 191. The CALCERT operator interface module 192 also invokes the appropriate instrument certification routines 191 for execution in response to the commands made by the technician. In some embodiments of the invention, the display of operator prompts on the touch screens 94a and 94b generated by the instrument certification routines 191 may be controlled by the CALCERT operator interface 192.

An operator interface, represented by module 194, functions as an interface for all system 20-operator interactions that are not entered through a module with a self-contained operator interface. In the described embodiment of the system 20 the master process 151 and the flight emulation test system program 162 do not include integral operator interfaces. The operator interface 192 establishes an operator communications path to those modules. Information and commands are exchanged between the operator interface 194 and the master control program 150 and the flight emulation test system 162 through the controlled shared memory 152.

Figure 8A:
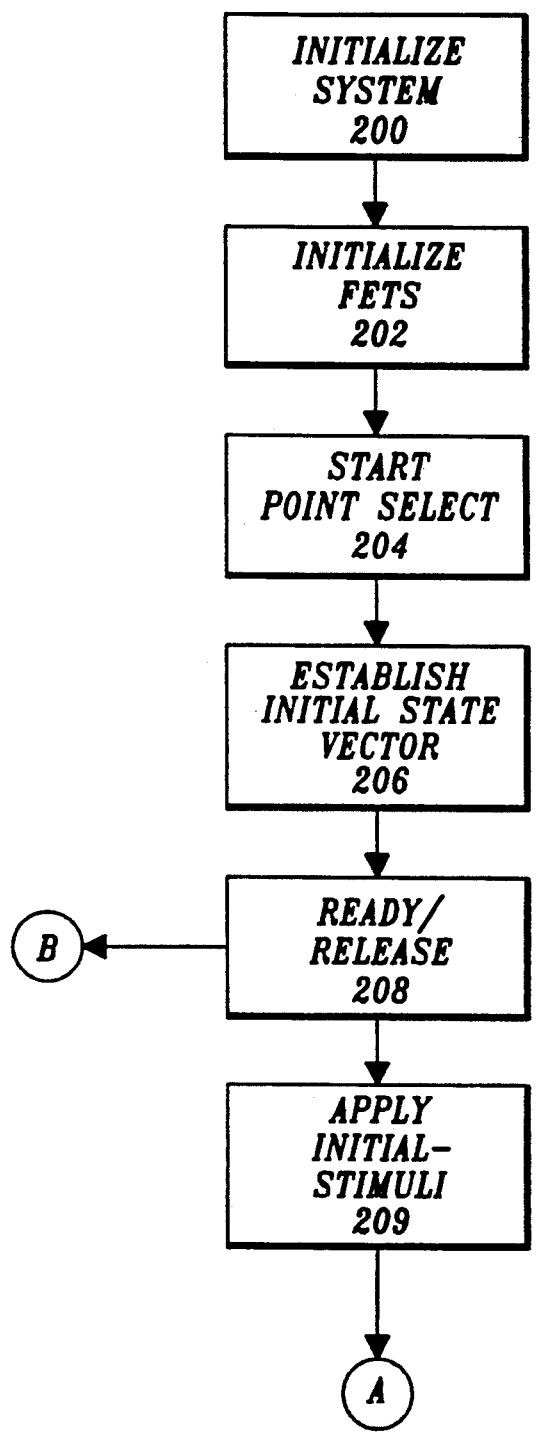
FIGS. 8a, 8b and 8c are flow charts depicting the various steps of a test process performed by a test system formed in accordance with this invention.
Figure 8B:
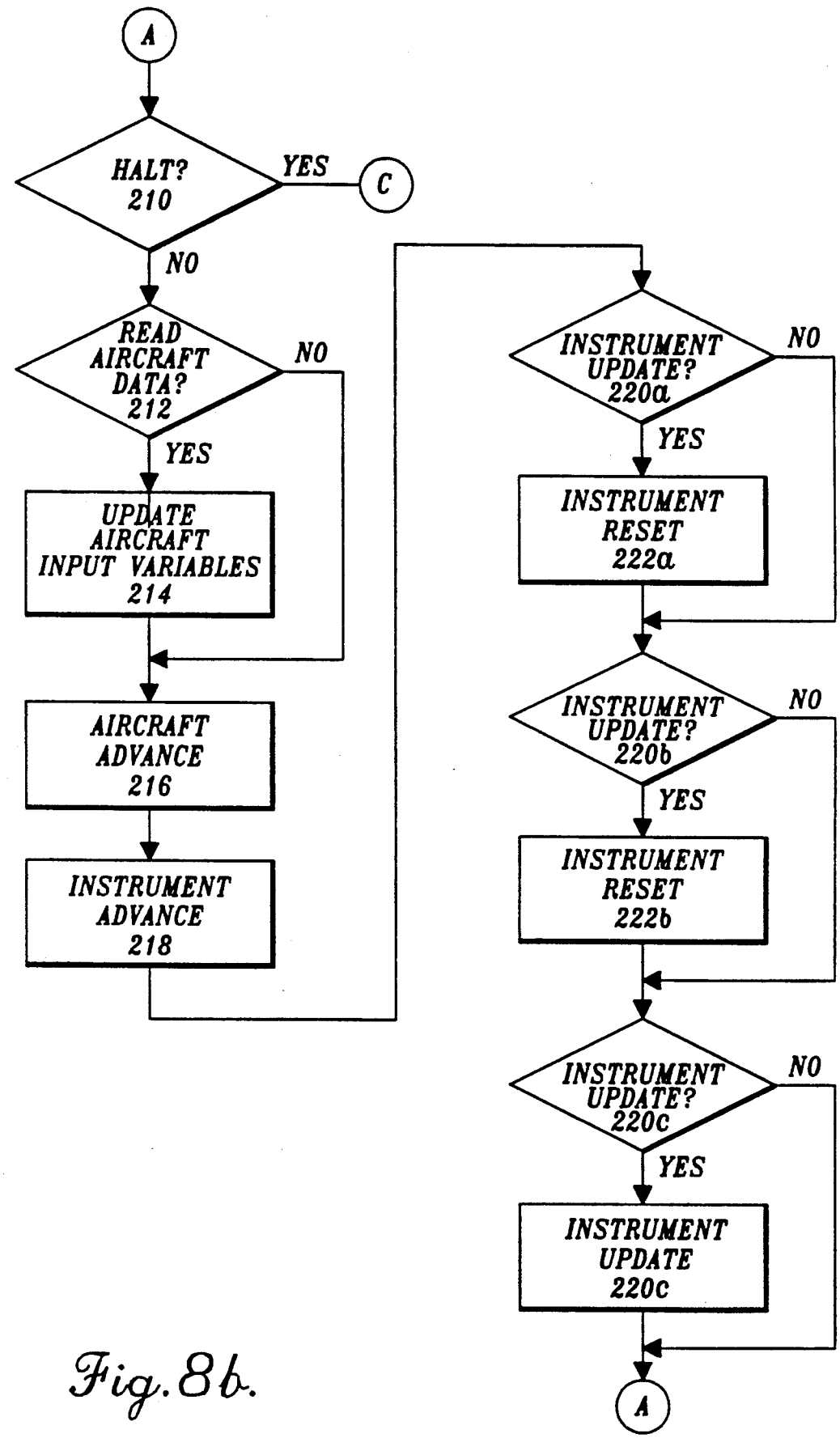
Figure 8C:
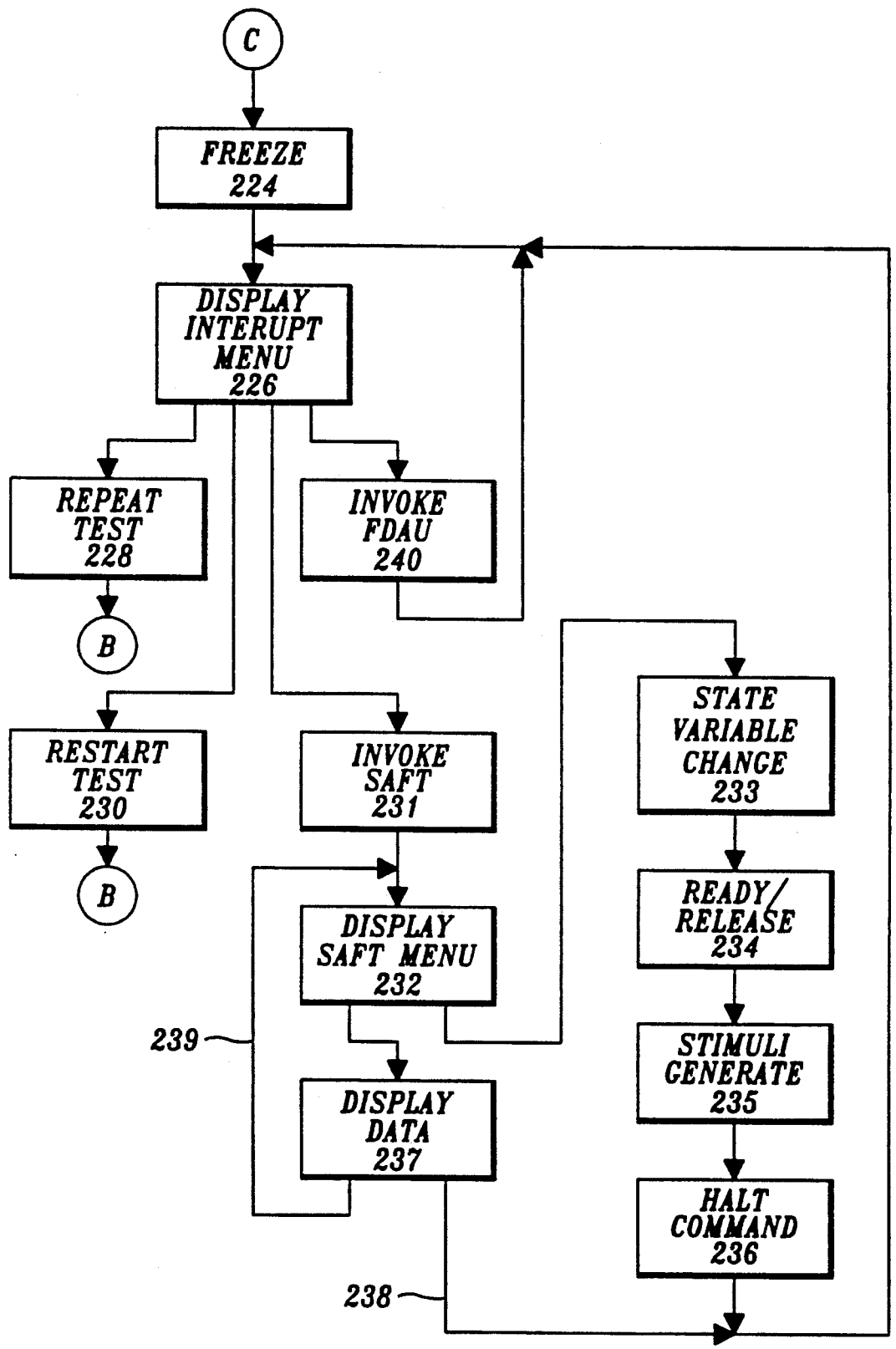

FIGS. 8a, 8b and 8c are flow diagrams of how the system 20 generates stimuli identical to those an aircraft 22 is exposed to in flight. After the system cables 26–34 and pneumatic hoses 36 and 38 have been properly connected to the aircraft 22, the system central processing unit 90 is initialized as represented by step 200. In the initialization step 200, the master control program 151 directs the operator interface 194 to display the modules that can be executed on the touch screens 94a and 94b. In response to module selection by an operator, the master control program 151 invokes the appropriate module for execution by the central processing unit 90. Step 202 depicts the initialization of the flight emulation test system module after the operator has indicated the system 20 is be used to simulate a flight test of the aircraft 22. This initialization is performed by the FETS initialization program 163.

Initialization of the flight emulation test system program 162 includes the establishment of an initial aircraft state vector 164. This process includes having the operator provide a start point for the aircraft 22 that establishes the aircraft 22 state for the start of the test, as represented by start point select step 204. The aircraft start point can be selected to that the test begins with the aircraft in position to take off, at cruising altitude, or on an approach path. In the start point select step 204 the operator is further able to establish the environmental conditions in which the aircraft 22 is to be tested. The environmental conditions include, but are not limited to, meteorological conditions and terrain features to which the aircraft is being exposed as part of the test. In response to the start point select step 204, the flight emulation test system program 162 establishes an initial aircraft state vector 164 represented by step 206. In the establish initial aircraft state vector step 206, the flight emulation test system program 162 establishes the initial aircraft state variables 157 and system instrument input parameters 159 for the aircraft state vector 164. The flight emulation test system program 162 has a small initialization module, not illustrated, that generates the initial variables based on the select point information entered by the operator.

After the initial aircraft state vector 164 has been set, the system enters a ready/release state represented by step 208. The central processing unit 90 displays a ready message to the operator. Once the operator releases the system 20, the FETS initialization program 163 directs the test system to apply emulation in-flight stimuli to the aircraft 22 in an apply initial stimuli step 209.

The sebsequent generation of stimuli is controlled by a set of repeatedly executed process steps 210–222, depicted in FIG. 8b, that are executed during each flight emulation frame. Initially, a HALT asserted test 210 is performed to determine whether or not the operator has entered a HALT command indicating that the flight emulation test should be stopped. The operator enters the HALT command by pressing the portion of touch screen 94a or 94b where a HALT command panel is displayed. If a HALT command has been asserted the system leaves the flight emulation test process and shifts to point C in FIG. 8c. Otherwise, the system proceeds with the flight emulation test.

An aircraft data update test 212 is next performed to determine whether the system 20 should update the aircraft input variables 158. The aircraft input variables 158 are not updated during each flight emulation frame because the output data from the aircraft components that form the variables do not significantly change from one frame to the next. The aircraft data update test 212 is used to minimize the frequency with which the aircraft input variables are updated in order to reduce the average time period of the flight emulation frames. During the aircraft data update test 212, the system first increments a frame counter whose value indicates how many frames have passed since the aircraft input variables 158 were last updated. The frame count is then compared to a stored cycle, or number of frames, value that determines when the aircraft input variables 158 should be updated. If the incremented frame count is less than the cycle value, the system 20 proceeds to an aircraft advance step 216. If the incremented frame count is equal to the cycle rate, the frame counter is zeroed and the flight emulation test system program 162 proceeds to an update aircraft input variables step 214. The update aircraft variables step 214 causes the flight emulation test system program to control and load unit 179 to read data from the system 20 measuring instruments into the appropriate aircraft input variables 158. The aircraft data update test 212 and update aircraft input variables step 214 are performed by the FETS control and load unit 179. In a preferred embodiment of the invention the update aircraft input variables step 214 is performed every other flight emulation frame. After the update aircraft variables step 214 is performed, the program advances to the aircraft advance step 216.

During the aircraft advance step 216, the flight dynamic equations 166 update the aircraft state variables 157 that form the aircraft state vector 164. The input variables into the flight dynamics equations are the initial aircraft state variables 157 and the aircraft input variables 158.

After the aircraft advance step 216 is performed, an instrument advance step 218 is performed. During the instrument advance step 218, the instrument adjust equations 170 are used to produce updated system instrument input parameters 158 for controlling the application of stimuli to the aircraft 22. The input variables into the instrument adjust equations 172 are the adjust updated aircraft state variables 157. To produce the instrument parameters for controlling the altitude and airspeed stimuli, the instrument adjust equations 170 rely on the air data predictor equations 172 to determine whether or not the airspeed and altitude stimuli should be controlled with respect to the calculated airspeed and altitude values or the adjusted values in order to compensate for the lag of the air data test unit 66. The execution of the instrument adjust step 218 completes the updating of the aircraft state vector 164.

After the aircraft state vector is updated, a series of instrument update tests 220a, b, c . . . and associated instrument update steps 222a, b, c . . . are performed by the FETS control and load unit 179. The instument update test 220a, b, c . . . are performed for the same reason the aircraft data update test 212 is performed; there is no need to reset each instrument during each time frame. Consequently, the instrument update tests 220a, b, c . . . are performed to interleave the resetting of the system 20 stimuli generating instruments so as to further reduce the average time period of the flight emulation frames. Each instrument update test 220a, b, c, . . . is thus used to control the frequency with which an associated stimuli generating instrument is reset. Each instrument update test 220a, b, c, . . . starts with incrementation of a frame count for the associated instrument. The incremented frame count is then compared to a stored frame value. If the incremented frame count for the insturment is less than the stored frame value the associated instrument update step 222a, b, c . . . is bypassed.

If the incremented frame count for an instrument is equal to the stored frame value, the system 20 proceeds to execute the associated instrument update step 222a, b, c, . . . The control and load unit accesses the appropriate tools and/or drivers in the tool library 160 and resets the instrument to produce stimuli with reference to the updated system instrument input variable 159. The rate with which any stimuli generating instrument is reset depends, in part, on: the rate stimuli produced by the instrument which can change; the rate at which the aircraft components respein to stimuli from the instrument; and, the time required to transmit the reset commands from the central processing unit 90 to the instrument. For example, in a preferred embodiment of the invention the inertial navigation simulator 72 is reset once every other flight emulation frame, signal generator 80, which generates glide slope signals, is reset every third flight emulation frame, and the air data test unit 66 is reset once every 15 flight. emulation frames.

The execution of the last instrument reset step 222 completes the final step performed in a flight emulation frame. The processing steps for the next flight emulation frame are then started by cycling to the HALT assert test 210. The system continues to update the aircraft state vector 164 and reset the stimuli applied to the aircraft until a HALT command is asserted.

During each flight emulation frame, the flight emulation test system program also writes each aircraft state vector 164 into the test data memory 156, step not illustrated. This may be done as a single operation after the last instrument update step 222. Alternatively, it may be done on a piecemeal basis wherein the aircraft state variables are copied after the update aircraft variables step 214, the aircraft input variables are copied after the aircraft advance step 216, and the individual system instrument input parameters are copied after the associated instrument update step 222 for the parameter. In alternative embodiments of the invention, the aircraft state vector 164 may be read into the test data memory 156 at alternative times. The initial aircraft state vector is also read into the test data memory 156 as part of the establish initial aircraft state vector step 206.

As shown in FIG. 8c, when an operator asserts the HALT command the system immediately performs a freeze step 224, which causes the contents of the aircraft state vector 164 to be loaded into the data passing shared memory 154 and the flight emulation test to be suspended. Control of the system is transferred from the flight emulation test system program 162 to the master process 151. After the freeze step 224, the master process 151 causes an interrupt menu to be displayed, as represented by step 226, which allows an operator to select the next process for execution by the system 20. Menu step 226 allows the operator to rerun the flight emulation test system program 162 using the initial aircraft state vector 164. If this option is selected the system executes a repeat test step 228 during which the flight emulation test system program 162 is reinvoked for execution and the initial aircraft state vector 164 is imported from test memory into the flight emulation test system program, followed by the program cycling to the ready release step 208 (FIG. 8a). This option may be selected when an aircraft component is malfunctioning and repetitive testing is needed to precisely identify the source of the fault. This option may also be selected when it is desirable to repeatedly expose a flight crew training with the system to a particular in-flight experience.

The display interrupt menu step 226 also allows an operator to restart the emulation test at the point it was initially suspended. If this option is selected, the system executes a restart test step 230 during which the flight emulation test system program 162 is reinvoked. In the restart test step 230 the last updated aircraft state vector 164 is imported from the test data memory 156 into the flight emulation test system program 162. Thereafter the program cycles to the ready release step 208 (FIG. 8a). This start-and-stop running of the system 20 may be desirable during flight crew training in order to break up the flight emulation test so that the performance of the aircraft and/or flight crew can be discussed.

The display interrupt menu step 226 can alternatively be used to invoke execution of the semi-automated flight test system program 180. This program allows an operator to change one or more of the system instrument input parameters 159 in order to observe the response of the aircraft 22 to different stimuli. For example, the semi-automated flight test system program 180 can be used to apply a changing glide slope signal to the aircraft while it is frozen in an approach state that indicates the aircraft is being blown off course by a gust of wind. This makes it possible to observe how the components of the aircraft which are connected to the on-aircraft glide slope receiver respond to this information.

The central processing unit master process 151 responds to a command to invoke the semi-automated flight test system program 180 by performing an invoke SAFT step 231 during which the semi-automated flight test system program 180 is invoked for execution. During the invoke SAFT step 231, the aircraft state variable stored in the data passing shared memory is copied into the SAFT aircraft state vector 181. After the semi-automated flight test system program 180 has been initialized a menu is displayed, as represented by step 232. The menu allows the operator to indicate which variables forming the aircraft state vector should be changed. In response to the selections entered by the operator, a state variable change step 233 is executed during which the step change and ramp routines 183 are executed to make the appropriate modifications to the selected input parameters in the SAFT aircraft state vector 181.

Once the SAFT aircraft state vector 181 has been modified, the system 20 enters a ready/release state represented by step 234. Once the operator releases the system 20, stimuli are applied to the system in a stimuli generate step 235. In the stimuli generate step 235, the SAFT control and load unit 182 uses the tools and drivers in the tool library 160 to set the stimuli generating instruments to produce stimuli with respect to the modified input parameters. The response of the aircraft components to the modified stimuli can then be observed and studied.

The operator terminates the application of modified stimuli by entering a halt command, depicted as step 236. The system 20 returns to the display interrupt menu step 226 to allow the operator to return to the flight emulation test process. As represented by restart test step 230, the flight emulation test can be restarted at the point at which it was frozen prior to the modification of the stimuli.

The semi-automated flight test system program 180 can also be invoked in order to monitor the performance of a specific aircraft 22 component. When this option is chosen, the appropriate semi-automated flight test system display routine 184 is invoked for execution by the central processing unit 90 in a display step 237. If this selection is made, the flight emulation test can then be restarted. When it is, output signals from the specific aircraft 22 component will be displayed on the touch screens 94a and 94b. Alternatively, the system 20 can be kept in the semi-automated flight test state by selecting a return to the SAFT menu step 232. When the selected stimuli are thereafter applied to the aircraft 22, the output signals from the selected aircraft component are displayed.

While the modification of stimuli and display of signals by the semi-automated aircraft test unit program 180 is depicted as occurring in a single set of steps it is understood that this is for purposes of illustration only. In a preferred embodiment of the invention the step change and ramp routines 183 allow the operator to modify the system instrument input parameters so that the stimuli applied to the aircraft can be varied in real time. This allows the operator to freeze the application of stimuli to the aircraft 22 and then change only one or two of the stimuli that are applied in order to observe its response to changes of the selected stimuli. When the selected stimulus is being applied to the aircraft 22, the appropriate display routines 184 may be simultaneously invoked so the output signals from selected aircraft components can be monitored.

The display interrupt menu step 226 also allows an operator to invoke other modules that control the system 20 for execution on the central processing unit 90. For example, the system flight data acquisition unit program 187 can be activated as indicated by an invoke FDAU step 240. During the invoke FDAU step 240, the system flight data acquisition unit program 187 is initialized to run concurrently with the flight emulation test system program 162 or the semi-automated test system program 180. After the invoke FDAU step 240, the system 20 returns to the display interrupt menu step 226 to allow the operator to select the process with which the aircraft flight data acquisition unit program 187 is run.

The aircraft test system 20 of this invention generates stimuli an aircraft would normally be exposed to in flight; monitors the response of the aircraft to the stimuli; and, in response generates updated stimuli that represent what the aircraft would be exposed to if it was moving through the air. In other words, an aircraft can be connected to this aircraft test system 22 in order to place the aircraft "in the loop" of a flight emulation. Personnel involved in the assembly and maintenance of an aircraft can use the system to verify the in-flight accuracy and reliability of aircraft components and systems while the aircraft is on the ground. The system of this invention is thus useful for minimizing the amount of flight testing to which an aircraft must be subjected in order to insure that its components and systems are functioning properly and that it can be flown safely. Moreover, the aircraft test system 20 of this invention can be used to repeatedly subject an aircraft to a specific set of stimuli it would receive during a section of flight by simply repeatedly running a portion of a flight emulation test. Thus, when it is necessary to repeatedly observe the performance of the aircraft during a certain part of a flight cycle for example, during takeoff, the system can be used to repeatedly generate take-off stimuli to the aircraft without having to also generate landing stimuli as would naturally occur if the aircraft was subjected to flight testing. Thus, the system also serves to minimize the amount of time required to test an aircraft since the aircraft can be exposed to repetitive test procedures without being flown through a complete flight cycle. This serves to further minimize the amount of time required to test the aircraft.

Another feature of this invention is that during the flight emulation test process instruments which measure the performance of the aircraft and the instruments that apply stimuli to the aircraft are not updated every flight emulation frame. This reduces the average time period for the flight emulation frames. As a result, the differences between the updated aircraft state input variables 158 and the previous variables are small enough to approximate the differences that would normally be observed when the aircraft 22 is in flight. The system stimuli generating instruments are reset as a direct result of changes in the aircraft state input variables 158. Consequently, the stimuli generating instruments produce stimuli that essentially duplicate the changing stimuli the aircraft is exposed to in flight.

Still another advantage of this system 20 is that the semi-automated flight test system 180 can be used to test the response of the aircraft to state conditions and events that seldom develop in flight such as, for example, the aircraft's response to a sudden down draft. A related advantage of the system 20 of this invention is that it can be used to observe the response of the aircraft to conditions and events that could place the aircraft and flight crew at risk if they occurred while in flight.

The aircraft test system 20 is also useful for training flight crews. This is because the system, in combination with an aircraft 22, simulates the response of the aircraft to not only in-flight stimuli but stimuli received from the aircraft such as automated and manual commands originating in the cockpit. The system is especially useful for part-task training of flight crews which involves teaching them how to use specific components of the aircraft. For example, the system can be used to teach flight crews how to operate the flight management computer 56c and how it can be used as a resource for certain in-flight procedures. Thus, the system can be used to train and observe the performance of flight crews without having to incur the costs and risks associated with flight training.

The foregoing description has been limited to a specific embodiment of this invention. It will be apparent, however, that variations and modifications may be made to the invention with the attainment of some or all of the advantages of the invention. For example, the described system instruments are merely instruments that may be provided in one embodiment of the invention in order to monitor the response of one particular type of aircraft. In other versions of the invention, fewer, additional or different instruments may be substituted as may be required. In alternative embodiments of the invention it may also be desirable to place other measuring devices on the movable surfaces of the aircraft and to use a system to monitor the output of these instruments. This would make it possible to monitor how quickly the control surfaces are actuated in response to commands issuing from the cockpit and to base the generation of the next aircraft state vector upon the real-time positions of the control surfaces. In these embodiments of the invention it would be desirable to place adjustable loads on the control surfaces, such as springs and hydraulic rams on the control surfaces, in order to simulate the in-flight loads applied to the control surfaces. The system 20 would then control the magnitude of the applied loads.

It is similarly understood that the described software modules that are executed on the central processing unit 90 and the order in which the steps of the flight emulation process occurs are also merely exemplary and not meant to be limiting. For example, each instrument update step 222a, b, c, ... is depicted as immediately following the associated instrument update test 220a, b, c, ... In some embodiments of the invention all the instrument update tests 220a, b, c, ... may occur consecutively followed by the instrument update steps 222a, b, c. . . for the selected instruments. Alternatively, the instrument update tests 220a, b, c, ... may all occur near simultaneously followed by the near-simultaneous execution of the appropriate instrument update steps 222a, b, c, ...

Other programs having the same or radically different construction than those described and that operates in substantially differently than those describe may be provided. In may also be desirable to provide additional modules to enhance the capabilities of the system 20. For example, it may be desirable to provide the central processing unit 90 with a set of diagnostic tools for automatically locating the source of faults for malfunctioning aircraft components. The diagnostic tools could take the form of sets of instructions that direct the system 20 to automatically apply certain patterns of stimuli to the aircraft 22 so that sources of faults can be quickly located. It may also be desirable to provide an event module with substitute aircraft state variables and alternative flight dynamics equations for controlling the production of stimuli. Such a module may, for instance, contain engine-out aircraft state variables and flight dynamics equations which model the performance of the aircraft when one or more engines are shut down. This module can be selectively invoked when flight crews are being trained using system 20 in order to teach the crews how to respond to engine-out events. Other event modules can include sets of aircraft state variables and/or flight dynamics equations that are used by the system 20 in conjunction with the aircraft 22 to emulate the occurrence of other unexpected in-flight events. Therefore, it is the object of the appended claims to cover all such variations and modifications as come within the true spirit and scope of the invention.

The embodiments of the invention in which an exclusive property or privilege is claimed are defined as follows:

1. An aircraft test system for evaluating the performance of an aircraft on the ground, the aircraft having a number of different aircraft components to which stimuli is applied and that, in reaction to the stimuli, generate measurable responses, including:
   a plurality of processor-controlled test instruments for generating different stimuli to which the aircraft components are exposed in flight including at least one instrument for generating at least one radio navigation signal received by an aircraft component, at least one instrument for generating an airflow monitored by an aircraft component, and at least one instrument for generating an electrical signal normally generated by a first aircraft component that is received by a second aircraft component;

a plurality of test instruments for measuring the response of the aircraft components to the stimuli to which they are exposed and for producing output signals representative of said measurements; and, processor means connected to said stimuli generating test instruments for controlling said test instruments and to said aircraft measuring test instruments for receiving said output signals representative of the measured responses of the aircraft components wherein, said processor means maintains an aircraft state vector containing a plurality of aircraft state variables, each said aircraft state variable describing a particular in-flight attribute of the aircraft, said processor means periodically produces updated said aircraft state variables based on the aircraft state vector at the start of the update process and the measured responses of the aircraft components, and said processor means adjusts the stimuli applied to the aircraft components based on said updated aircraft state variables so that the stimuli applied to the aircraft components emulates the stimuli applied to aircraft components when the aircraft is in flight.

2. The aircraft test system of claim 1, wherein at least one of said stimuli generating test instruments generates airflows simulating pitot and static air flows monitored by an aircraft component.

3. The aircraft test system of claim 2, wherein at least one said stimuli generating test instrument generates signals normally generated by an on-aircraft inertial navigation reference unit.

4. The aircraft test system of claim 3, further including an operator interface means connected to said processor means for allowing an operator to control the generation of stimuli through said processor means.

5. The air data system of claim 3, wherein at least one said stimuli generating test instrument receives radio altimeter interrogation signals emitted by the aircraft and transmitted return radio altimetry interrogation signals to the aircraft based on a time delay that emulates the in-flight emission and reception of signals by the aircraft.

6. The aircraft test system of claim 5, wherein at least one said stimuli generating instrument generates instrument landing, glide slope and localizer signals emulating the glide slope and localizer signals normally received by the aircraft.

7. The aircraft test system of claim 6, further including at least one said stimuli generating instrument for generating engine performance signals emulating engine performance signals normally transmitted by an aircraft engine to another component of the aircraft.

8. The aircraft test system of claim 7, wherein:

at least one of said measuring instruments is adapted for connection to the aircraft for receiving command signals sent between aircraft components; and said processor means is further adapted to produce said updated aircraft state variables in response to the commands transferred between the aircraft components that are monitored by said measuring instrument that receives said commands.

9. The aircraft test system of claim 7, further including at least one said measuring test instrument for recording signals from an aircraft component that are normally read for storage by an on-aircraft flight data acquisition unit; a flight data reader connected to the aircraft flight data acquisition unit for reading the data stored by the flight data acquisition unit; and, said processor means is connected to said flight data reader for reading the flight data recorded from said flight data reader and comparing said data with said measuring instrument output signals.

10. The aircraft test system of claim 1, wherein said aircraft state vector includes a plurality of instrument input parameters, wherein each said input parameter describes an attribute of a specific stimulus that is generated by said stimuli generating instruments, and said processor means adjusts the application of stimuli to the aircraft components by initially updating at least one of said aircraft state variables updating at least one instrument input parameter based on said updated aircraft state variable, and adjusting at least one of said stimuli generating instruments based on said updated instrument input parameter.

11. The aircraft test system of claim 10, wherein:

at least one said stimuli generating instrument has a lag between the time at which said instrument is directed to adjust said stimuli applied to the aircraft and time at which said adjusted stimuli is applied to the aircraft; and said processor means produces control signals for controlling stimuli generated by said lagging stimuli generating instrument based on a predictor equation from which control signals are produced to overdrive said stimuli generating instrument so that said stimuli generating instrument will produce stimuli approximately equal to said real time stimuli.

12. The air data test system of claim 11, wherein said stimuli generating instrument for producing said airflow is said lagging instrument and said processor means controls production of said airflow based on a set of air data lag predictor equations.

13. The aircraft test system of claim 10, wherein:

said aircraft state vector includes a plurality of aircraft input variables, each said aircraft input variable describing aircraft information measured by said system measuring instruments; and said processor means updates said aircraft state vector in a series of flight emulation frames wherein, in each said flight emulation frame said processor means produces updated aircraft state variables based on said aircraft input variables and said aircraft state variables at the beginning of said frame and produces updated instrument input parameters based on said updated aircraft state variables.

14. The aircraft test system of claim 13, wherein during said flight emulation frames said processor means adjusts said stimuli generating instruments based on said updated instrument input parameters and said processor means updates at least one said stimuli generating instrument at a rate less than once every said flight emulation frame.

15. The aircraft test system of claim 14, wherein during said flight emulation frames said processor means updates said aircraft input variables based on measurements made by said test instruments and said processor means updated at least one said aircraft input variable at a rate less than once every flight emulation frame.

16. The aircraft test system of claim 15, wherein said processor means is provided with an interface unit for allowing manual entry of start point data, and said processor means produces an initial aircraft state vector based on said start point data and wherein said processor means generates a subsequent said aircraft state vectors based on said initial aircraft state vector.

17. The aircraft test system of claim 13, wherein during said flight emulation frames said processor means updates said aircraft input variables based on said measurements made by said test instruments and said processor means updates at least one said aircraft input variable at a rate less than once every said flight emulation frame.

18. The aircraft test system of claim 1, wherein said processor means is provided with an interface unit for allowing manual entry of start point data, and said processor means produces an initial aircraft state vector based on said start point data, and said processor means generates a subsequent said aircraft state vector based on said initial aircraft state vector.

19. An aircraft test system for emulating the in-flight performance of an aircraft on the ground, the aircraft including a plurality of aircraft components to which stimuli is applied and that in reaction to the stimuli, generate measurable responses, said system including:
 a plurality of processor-controlled test instruments generating the stimuli to which the aircraft components are exposed to in flight, including a test instrument for generating a radio signal received by an aircraft navigation receiver, a test instrument for generating an airflow monitored by an aircraft component, and an instrument for generating an electrical signal produced by a first aircraft component that is received by a second aircraft component;
 a plurality of monitoring instruments for measuring the response of aircraft components to the stimuli to which they are exposed and for producing output signals representative of said measurements, wherein at least one of said measuring test instruments is connected to an aircraft component different than the aircraft components to which stimuli is applied; and
 a processor unit connected to said stimuli generating test instruments for controlling said test instruments and said aircraft measuring test instruments for receiving said output signals therefrom, wherein said processing unit maintains a plurality of aircraft state variables, each said aircraft state variable describing a particular in-flight attribute of the aircraft, a plurality of aircraft input variables, each said aircraft input variable describing aircraft information measured by said measuring instruments, and a plurality of instrument input parameters, each said instrument parameter describing an attribute of a specific stimuli generated by one of said stimuli-generating instruments, and said processor means continually changes the stimuli applied to the aircraft components in a series of flight emulation frames, wherein in each flight emulation frame said aircraft state variables are updated based on said aircraft state variables at the beginning of said frame and said aircraft input variables and said instrument input parameters are updated based on said updated aircraft state variables and wherein during selected flight emulation frames, said processing unit said updates said aircraft input variables based on the measurements made by said monitoring instruments and adjusts said stimuli-generating instruments based on said updated instrument input parameters.

20. The aircraft test system of claim 19, wherein said aircraft input variables are updated at a rate less than once every flight emulation frame.

21. The aircraft test system of claim 19, wherein a first one of said stimuli-generating test instruments is updated at a first rate, a second one of said stimuli generating instruments is updated and wherein said rates at which said first and second stimuli generating test instruments are updated is different and said first and second stimuli generating instruments are updated at rates less than once every flight emulation frame.

22. The aircraft test system of claim 19, wherein said aircraft input variables are updated at a rate less than once every flight emulation frame.

* * * * *

UNITED STATES PATENT AND TRADEMARK OFFICE
CERTIFICATE OF CORRECTION

PATENT NO. : 5,260,874
DATED : November 9, 1993
INVENTOR(S) : A. E. Berner et al.

It is certified that error appears in the above-indentified patent and that said Letters Patent is hereby corrected as shown below:

| COLUMN | LINE | |
|---|---|---|
| Title Page [75] "Inventors" | 3 | "Hugh C. Murray" should read --Hugh C. Unangst-- |
| 15 | 12 | "form the type" should read --from the-- |
| 15 | 22 | "property" should read --properly-- |
| 16 | 56 | "sebsequent" should read --subsequent-- |
| 18 | 20 | "respein" should read --respond-- |
| 21 | 65 | after "movable" insert --control-- |

Signed and Sealed this

Twenty-first Day of June, 1994

Attest:

BRUCE LEHMAN

*Attesting Officer*     *Commissioner of Patents and Trademarks*